US010460398B1

(12) United States Patent
Gielow et al.

(10) Patent No.: US 10,460,398 B1
(45) Date of Patent: *Oct. 29, 2019

(54) METHOD AND SYSTEM FOR CROWDSOURCING THE DETECTION OF USABILITY ISSUES IN A TAX RETURN PREPARATION SYSTEM

(71) Applicant: Intuit Inc., Mountain View, CA (US)

(72) Inventors: Christopher C. Gielow, Carlsbad, CA (US); Igor A. Podgorny, San Diego, CA (US); Joseph Cessna, San Diego, CA (US); Matthew Cannon, San Diego, CA (US)

(73) Assignee: Intuit Inc., Mountain View, CA (US)

(*) Notice: Subject to any disclaimer, the term of this patent is extended or adjusted under 35 U.S.C. 154(b) by 588 days.

This patent is subject to a terminal disclaimer.

(21) Appl. No.: 15/221,251

(22) Filed: Jul. 27, 2016

(51) Int. Cl.
*G06Q 40/00* (2012.01)
*G06Q 50/00* (2012.01)
*G06Q 30/00* (2012.01)

(52) U.S. Cl.
CPC ......... *G06Q 40/123* (2013.12); *G06Q 30/016* (2013.01); *G06Q 50/01* (2013.01)

(58) Field of Classification Search
None
See application file for complete search history.

(56) References Cited

U.S. PATENT DOCUMENTS 5,471,382 A 11/1995 Tallman et al.
5,519,608 A 5/1996 Kupiec
(Continued)

FOREIGN PATENT DOCUMENTS

CN 101520802 4/2009
EP 2159715 3/2010
(Continued)

OTHER PUBLICATIONS

S. Grant, R. Marciano, P. Ndiaye, K. E. Shawgo and J. Heard, "The human face of crowdsourcing: A citizen-led crowdsourcing case study," 2013 IEEE International Conference on Big Data, Silicon Valley, CA, 2013, pp. 21-24. (Crowdsource) (Year: 2013).*
The Scientific Marketer, "Uplift Modelling FAQ", article date of Sep. 27, 2007, retrieved from http://scientificmarketer.com/2007/09/uplift-modelling-faq.html (Year: 2007).
(Continued)

*Primary Examiner* — Chikaodinaka Ojiaku
(74) *Attorney, Agent, or Firm* — Hawley Troxell Ennis & Hawley LLP; Philip McKay

(57) ABSTRACT

Disclosed methods and systems crowdsource the detection of usability issues in user experience pages of a tax return preparation system, according to one embodiment. Testing and debugging combinations and sequences of user experience pages can be time consuming and costly, and crowdsourcing the detection of usability issues can reduce the length of time typically consumed in detecting issues in a user experience flow, according to one embodiment. The methods and system include monitoring users' navigation behavior (e.g., system access data) within user experience pages, using predictive models to detect when users are experiencing a potential issue, and providing issue resolution content to both help the users and characterize the potential issue, according to one embodiment. If the potential issue is a usability issue, the methods and systems include requesting more information about the usability issue, to facilitate resolving the usability issue for current and subsequent users, according to one embodiment.

30 Claims, 10 Drawing Sheets

(56) References Cited

U.S. PATENT DOCUMENTS

| | | | |
|---|---|---|---|
| 6,147,975 A | 11/2000 | Bowman-Amuah | |
| 6,601,055 B1 | 7/2003 | Roberts | |
| 7,013,263 B1 | 3/2006 | Isaka et al. | |
| 7,222,078 B2 | 5/2007 | Abelow | |
| 7,385,716 B1 | 6/2008 | Skaanning | |
| 7,594,176 B1 | 9/2009 | English | |
| 7,685,144 B1 | 3/2010 | Katragadda | |
| 7,974,860 B1 | 7/2011 | Travis | |
| 8,200,527 B1 | 6/2012 | Thompson et al. | |
| 8,311,792 B1 | 11/2012 | Podgorny et al. | |
| 8,341,167 B1 | 12/2012 | Podgorny et al. | |
| 8,484,228 B2 | 7/2013 | Bhattacharyya et al. | |
| 8,645,298 B2 | 2/2014 | Hennig et al. | |
| 8,660,849 B2 | 2/2014 | Gruber et al. | |
| 8,817,968 B1 | 8/2014 | Boutcher et al. | |
| 8,892,539 B2 | 11/2014 | Anand et al. | |
| 8,909,568 B1 | 12/2014 | Mann et al. | |
| 8,943,145 B1 | 1/2015 | Peters et al. | |
| 8,983,977 B2 | 3/2015 | Ishikawa et al. | |
| 9,015,031 B2 | 4/2015 | Ferrucci et al. | |
| 9,060,062 B1 | 6/2015 | Madahar et al. | |
| 9,063,983 B1 | 6/2015 | Lee | |
| 9,247,066 B1 | 1/2016 | Stec et al. | |
| 9,336,211 B1 | 5/2016 | Bousquet et al. | |
| 9,336,269 B1 | 5/2016 | Smith et al. | |
| 9,342,608 B2 | 5/2016 | Cook et al. | |
| 9,460,191 B1 | 10/2016 | Gaucher et al. | |
| 9,471,883 B2 | 10/2016 | Chatterjee et al. | |
| 9,582,757 B1 | 2/2017 | Holmes et al. | |
| 9,633,309 B2 | 4/2017 | Giffels et al. | |
| 9,779,388 B1 | 10/2017 | Hansen et al. | |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 10,002,177 B1 | 6/2018 | McClintock et al. | |
| 10,083,213 B1 | 9/2018 | Podgorny et al. | |
| 10,134,050 B1 | 11/2018 | Hung et al. | |
| 10,147,037 B1 | 12/2018 | Podgorny et al. | |
| 10,162,734 B1 | 12/2018 | Podgorny et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0099924 A1 | 5/2003 | Tsuboi et al. | |
| 2003/0144873 A1 | 7/2003 | Keshel | |
| 2004/0024739 A1 | 2/2004 | Copperman et al. | |
| 2005/0114327 A1 | 5/2005 | Kumamoto et al. | |
| 2006/0085750 A1 | 4/2006 | Easton et al. | |
| 2006/0265232 A1 | 11/2006 | Katariya et al. | |
| 2007/0011131 A1 | 1/2007 | Delefevre | |
| 2007/0219863 A1 | 9/2007 | Park et al. | |
| 2007/0259325 A1 | 11/2007 | Clapper | |
| 2007/0294195 A1* | 12/2007 | Curry | G06Q 40/025 705/500 |
| 2008/0189197 A1 | 8/2008 | Allanson et al. | |
| 2008/0208610 A1 | 8/2008 | Thomas et al. | |
| 2008/0215541 A1 | 9/2008 | Li et al. | |
| 2008/0294637 A1 | 11/2008 | Liu | |
| 2009/0012926 A1 | 1/2009 | Ishikawa et al. | |
| 2009/0119575 A1 | 5/2009 | Velusamy | |
| 2009/0162824 A1 | 6/2009 | Heck | |
| 2009/0248659 A1 | 10/2009 | McCool et al. | |
| 2009/0253112 A1 | 10/2009 | Cao et al. | |
| 2009/0265340 A1 | 10/2009 | Barcklay et al. | |
| 2010/0068687 A1 | 3/2010 | Bertelsen | |
| 2010/0070554 A1 | 3/2010 | Richardson et al. | |
| 2010/0076998 A1 | 3/2010 | Podgorny et al. | |
| 2010/0088262 A1 | 4/2010 | Visel et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205550 A1 | 8/2010 | Chen et al. | |
| 2010/0235361 A1 | 9/2010 | Chandran et al. | |
| 2010/0241971 A1 | 9/2010 | Zuber | |
| 2010/0318919 A1 | 12/2010 | Murphy et al. | |
| 2011/0055699 A1 | 3/2011 | Li et al. | |
| 2011/0125734 A1 | 5/2011 | Duboue et al. | |
| 2011/0202472 A1 | 8/2011 | Wan et al. | |
| 2011/0231347 A1 | 9/2011 | Xu et al. | |
| 2011/0264569 A1 | 10/2011 | Houseworth et al. | |
| 2011/0282892 A1 | 11/2011 | Castellani et al. | |
| 2012/0005148 A1 | 1/2012 | Horvitz et al. | |
| 2012/0005219 A1 | 1/2012 | Apacible et al. | |
| 2012/0022983 A1 | 1/2012 | Hughes et al. | |
| 2012/0030079 A1* | 2/2012 | Slater | G06Q 40/00 705/35 |
| 2012/0084120 A1 | 4/2012 | Hirsch et al. | |
| 2012/0084185 A1 | 4/2012 | Ciaramitaro et al. | |
| 2012/0084293 A1 | 4/2012 | Brown et al. | |
| 2012/0095976 A1 | 4/2012 | Hebenthal et al. | |
| 2012/0130910 A1 | 5/2012 | Al-Alami | |
| 2012/0130978 A1 | 5/2012 | Li et al. | |
| 2012/0136764 A1* | 5/2012 | Miller | G06Q 40/123 705/31 |
| 2012/0166438 A1 | 6/2012 | Wu et al. | |
| 2012/0219142 A1 | 8/2012 | Gould | |
| 2012/0233191 A1 | 9/2012 | Ramanujam | |
| 2012/0331052 A1 | 12/2012 | Rathod | |
| 2013/0019286 A1 | 1/2013 | Barborak et al. | |
| 2013/0054497 A1 | 2/2013 | Garland et al. | |
| 2013/0066693 A1 | 3/2013 | Laird-McConnell et al. | |
| 2013/0073390 A1 | 3/2013 | Konig et al. | |
| 2013/0110823 A1 | 5/2013 | Su et al. | |
| 2013/0111323 A1 | 5/2013 | Taghaddos et al. | |
| 2013/0117677 A1 | 5/2013 | St. Jacques, Jr. | |
| 2013/0282363 A1 | 10/2013 | Fan et al. | |
| 2013/0285855 A1 | 10/2013 | Dupray et al. | |
| 2013/0297553 A1 | 11/2013 | Bierner | |
| 2013/0304730 A1 | 11/2013 | Zhou | |
| 2013/0325992 A1 | 12/2013 | McGann et al. | |
| 2013/0339870 A1 | 12/2013 | Tandra Sishtla et al. | |
| 2014/0006012 A1 | 1/2014 | Zhou et al. | |
| 2014/0022328 A1 | 1/2014 | Gechter et al. | |
| 2014/0052606 A1 | 2/2014 | Vasudevan et al. | |
| 2014/0075004 A1 | 3/2014 | Van Dusen et al. | |
| 2014/0088944 A1 | 3/2014 | Natarajan et al. | |
| 2014/0114822 A1 | 4/2014 | Sharma et al. | |
| 2014/0119531 A1 | 5/2014 | Tuchman et al. | |
| 2014/0172883 A1 | 6/2014 | Clark et al. | |
| 2014/0189829 A1 | 7/2014 | McLachlan et al. | |
| 2014/0195613 A1 | 7/2014 | Ogilvie | |
| 2014/0201045 A1 | 7/2014 | Pai et al. | |
| 2014/0222669 A1 | 8/2014 | Novak et al. | |
| 2014/0244528 A1* | 8/2014 | Zhang | G06Q 40/02 705/318 |
| 2014/0280070 A1 | 9/2014 | George et al. | |
| 2014/0308648 A1 | 10/2014 | Jain | |
| 2014/0316856 A1 | 10/2014 | Williams et al. | |
| 2014/0324856 A1 | 10/2014 | Lahiani et al. | |
| 2014/0337257 A1 | 11/2014 | Chatterjee et al. | |
| 2014/0372980 A1 | 12/2014 | Verma et al. | |
| 2015/0052087 A1 | 2/2015 | Srinivasan et al. | |
| 2015/0058380 A1 | 2/2015 | Polonsky et al. | |
| 2015/0088608 A1 | 3/2015 | Cama et al. | |
| 2015/0095267 A1 | 4/2015 | Behere et al. | |
| 2015/0120718 A1 | 4/2015 | Luo et al. | |
| 2015/0127587 A1 | 5/2015 | Pinckney et al. | |
| 2015/0139415 A1 | 5/2015 | Skiba et al. | |
| 2015/0229531 A1 | 8/2015 | O'Sullivan et al. | |
| 2015/0254785 A1 | 9/2015 | Yang | |
| 2015/0324805 A1 | 11/2015 | Skiba et al. | |
| 2015/0363481 A1 | 12/2015 | Haynes | |
| 2015/0371137 A1 | 12/2015 | Giffels et al. | |
| 2016/0048772 A1 | 2/2016 | Bruno et al. | |
| 2016/0055234 A1 | 2/2016 | Visotski et al. | |
| 2016/0062980 A1 | 3/2016 | Boguraev et al. | |
| 2016/0103833 A1 | 4/2016 | Sanders et al. | |
| 2016/0148222 A1 | 5/2016 | Davar et al. | |
| 2016/0148321 A1* | 5/2016 | Ciaramitaro | G06Q 40/123 705/31 |
| 2016/0180470 A1* | 6/2016 | Mascaro | G06Q 10/0639 705/7.38 |

(56) References Cited

U.S. PATENT DOCUMENTS

| | | |
|---|---|---|
| 2016/0189029 A1 | 6/2016 | Giffels et al. |
| 2016/0196497 A1 | 7/2016 | Allen et al. |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0124184 A1 | 5/2017 | Podgorny et al. |
| 2017/0270159 A1 | 9/2017 | Wang et al. |
| 2017/0323233 A1 | 11/2017 | Bencke et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2019/0018692 A1 | 1/2019 | Indyk et al. |
| 2019/0018899 A1 | 1/2019 | Podgorny et al. |

FOREIGN PATENT DOCUMENTS

| | | |
|---|---|---|
| JP | 2014112316 | 6/2014 |
| WO | WO 2011/053830 | 5/2011 |

OTHER PUBLICATIONS

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the $33^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Dror, et al., "From Query to Question in One Click: Suggesting Synthetic Questions to Searchers," World Wide Web, International World Wide Web Conferences Steering Committee, Republic and Canton of Geneva, Switzerland; May 13, 2013, pp. 391-402.

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

\* cited by examiner

FIG. 3B intuit
TurboTax® Home & Business | My Account∨ | ⌕ Search | ☏ Contact

< Tax Timeline | Personal Info | Business | Personal | State Taxes | Review | File $355 Federal Refund
$0 CA Refund Analysis  Audit Defense  Summary

Check This Entry

Federal Information Worksheet: Is Form 8862 required? If the IRS did not allow you to take the earned income credit in a past year, you may need to file this form.

● No entry
○ Must file Form 8862 box
○ No Form 8862 required box get a federally funded benefit, such as Medicaid and, the Social Security card contains the legend Not Valid for Employment, check this box (see Help) ☐
check if you are filing head of household and your spouse is a non resident alien and you lived with your spouse during the last six months of 2015 ☐
Was EIC disallowed or reduced in a previous year and are you required to file Form 8862 this year? ○ Yes ○ No
Check if you were notified by the IRS that EIC cannot be claimed in 2015 or if you are ineligible to claim the EIC in 2015 for any other reason ☐

Part V – Direct Deposit or Direct Debit Information (not applicable for Form 9465)

[Continue]

Hide

Feeling stuck?
Advice from others with this error might help

How do I enter Form 8862?
Answered by TurboTax

I do not understand the error about Form 8862
Answered by TurboTax Community

How do attach Form 8862
Answered by TurboTax Community

[Tell us whats wrong]

350
352

METHOD AND SYSTEM FOR CROWDSOURCING THE DETECTION OF USABILITY ISSUES IN A TAX RETURN PREPARATION SYSTEM

BACKGROUND

Tax return preparation systems are valuable tools that provide services that were previously available only through interaction with a human professional, if not attempted by oneself. Prior to the advent of tax return preparation systems, a user would be required to consult with a tax preparation professional for services, and the user would be limited, and potentially inconvenienced, by the hours during which the professional was available for consultation. Furthermore, the user might be required to travel to the professional's physical location. Beyond the inconveniences of scheduling and travel, the user would also be at the mercy of the professional's education, skill, personality, and varying moods. All of these factors resulted in a user who was vulnerable to human error, variations in human ability, and variations in human temperament.

A tax return preparation system can provide benefits that human professionals are hard-pressed to provide, such as: not having limited working hours, not being geographically limited, and not being subject to human error or variations in human ability or temperament. A tax return preparation system can also be configured to provide personalized services to users based on characteristics of individual users and based on the users' history with the tax return preparation system. To provide such services, a tax return preparation system can be programmed to include and select from tens of thousands of user experience pages to assist tax filers in preparing their tax returns. This massive number of user experience pages can make user experience debugging a logistical nightmare for a service provider.

Long-tail user experiences make it virtually impossible for service providers to humanly test (e.g., click through and evaluate) every combination of, for example, tens of thousands of user experience pages in a tax return preparation system. Long-tail user experiences are generally user experiences where only small quantities of users reach many of the particular combinations/sequences of user experience pages. Even though service providers have developers test their code before deploying it in new versions of tax return preparation systems, the man hours and man power required to test every combination, sequence, or probable combination of user experience pages makes such testing and debugging practices difficult to justify the costs paid for the benefits received. However, even if a user experience flow is sufficient for some users (e.g., experienced users), other users may experience issues during their interaction with user experience pages. Running into issues, such as instructions that are hard to understand or menus that are hard to find, may decrease customers' confidence in the tax return preparation system and in the service provider of said system. Decreased customer confidence may cause a customer to seek the services of competitor service providers. Such an outcome is neither desirable for the customer nor the service provider.

What is needed is a method and system for crowdsourcing the detection of usability issues in a tax return preparation system, according to one embodiment.

SUMMARY

Asking a frustrated customer for feedback can be a fruitless endeavor. Very few customers are willing or even able to offer unbiased or helpful feedback when the object that they are requested to provide feedback on coincides with the object of their frustration. The feedback solicited is typically presented in a format that makes it apparent that the customer's inconvenience in providing feedback is clearly for the benefit of other customers, e.g., subsequent users of a product. As a result, many frustrated customers decline to provide feedback or provide feedback that is tainted with a seething tone, content, or bias. Thus, the feedback of a frustrated customer can be hard to extract value from.

On the other hand, requesting information from a frustrated customer, while proactively attempting to provide assistance to the frustrated customer, may be perceived by the customer to be a mutually beneficial request. Customers can become frustrated when they come upon usability issues in a tax return preparation system, at least partially, because doing one's taxes is typically an undesirable task that is ideally completed as quickly as possible. The service provider would like to ameliorate negative user experiences and would also like to obtain additional information about the usability issues in order to fix them for both present and subsequent users. As disclosed herein, a tax return preparation system detects and characterizes usability issues in a user experience flow by: detecting when a user is likely to have experienced usability issues, offering support to the user (e.g., while the user is experiencing the usability issues), and soliciting information from the user to help the user progress past the usability issues while concurrently collecting information from the user about the usability issues, according to one embodiment.

A usability issue relates to an issue in the operation of one or more user experience pages of the tax return preparation system that affects at least some users, but not necessarily all users, according to one embodiment. A usability issue in one or more user experience pages of the tax return preparation system relates to how content is delivered (e.g., the language used in a description) and how information is received from users (e.g., the location of buttons/menus), according to one embodiment. A usability issue is a deficiency in one or more user experience pages that is experienced by some (but usually not all) users who land on a particular user experience page, according to one embodiment. A usability issue is not an error in user experience element design, placement or function, but instead relates to the interpretation of properly functioning user experience elements, according to one embodiment. In one embodiment, a usability issue is another way of describing user error in the tax return preparation system.

The present disclosure includes embodiments of methods and systems for crowdsourcing the detection of usability issues in a tax return preparation system. The tax return preparation system applies user characteristics data and/or system access data to one or more predictive models to identify when users experience a potential issue in one or more user experience pages, according to one embodiment. The potential issue can be a question or can be the identification of a usability issue within one or more of the user experience pages, according to one embodiment. The one or more predictive models are trained to identify variations in normal system access data (e.g., navigation behavior) for users of the tax return preparation system and provide issue resolution content to the user, according to one embodiment. The issue resolution content is provided to: 1) help the user feel that the tax return preparation system is proactively attempting to resolve potential issues for the user, 2) identify questions or usability issues identified by the user, and 3) obtain additional information about the questions or usability issues to improve the user experience for the current and subsequent users of the tax return preparation system, according to one embodiment.

The issue resolution content includes content that is delivered to the user to resolve and/or characterize a potential issue that a user may have with the content of one or more user experience pages, according to one embodiment. The issue resolution content includes, but is not limited to, questions and answers that are relevant to the user experience page(s) viewed by the user, user interface elements to allow the user to identify a question or usability issue, question input text boxes, suggestions for improving the user's question, and empathetic messages that convey sympathy for the user's frustration, uncertainty, and/or doubt, according to one embodiment.

The tax return preparation system receives responses from the users regarding the potential issues experienced by the user, according to one embodiment. The tax return preparation system and/or one or more support systems use the users' responses, user characteristics for the user, and/or system access data associated with the users to further characterize the potential issue, according to one embodiment. If the potential issue is a usability issue in a user experience page, the tax return preparation system, support system, and/or support personnel can prepare and/or deploy one or more updates and/or fixes to resolve the usability issue, and can immediate provide guidance to the user on how to complete the user's intended task, according to one or more embodiments.

The tax return preparation system facilitates the use of crowdsourcing to identify and characterize usability issues within one or more user experience pages of the tax return preparation system, according to one embodiment. By detecting potential issues for users and offering support to users, the tax return preparation system is able to convert potential usability issues into verified usability issues, while concurrently attempting to resolve the potential issue and gain further information to characterize the potential or verified usability issue, according to one embodiment.

These and other embodiments of the tax return preparation system are discussed in further detail below.

By crowdsourcing the detection of usability issues in a tax return preparation system, implementation of embodiments of the present disclosure allows for significant improvement to the fields of software development, electronic tax return preparation, data collection, and data processing, according to one embodiment. As illustrative examples, by crowdsourcing the detection of usability issues in a tax return preparation system, more combinations and permutations of features can be deployed more rapidly with less rigorous testing, saving both time and cost associated with testing every probable sequence or combination of user experience pages in the tax return preparation system, according to one embodiment. As a result, embodiments of the present disclosure allow for reduced use of processor cycles, memory, and power consumption associated with testing potentially tens of thousands of user experience page combinations prior to each new revision or release of a tax return preparation system, according to one embodiment. Consequently, computing and communication systems implementing and/or providing the embodiments of the present disclosure are transformed into more operationally efficient devices and systems.

Because usability issues in user experience pages of a tax return preparation system is an Internet-centric and computing system-centric problem, the solutions to these problems are not abstract ideas.

In addition to improving overall computing performance, by crowdsourcing the detection of usability issues in a tax return preparation system, implementation of embodiments of the present disclosure represent a significant improvement to the field of efficient deployment of software systems. As a result, service providers can accomplish more development with less manpower and/or deploy additional technology under shorter integration delays, according to one embodiment. Additionally, by crowdsourcing the detection of usability issues in a tax return preparation system, including proactively working to resolve customer issues or potential issues, the disclosed embodiments help maintain and/or build trust and therefore loyalty in the tax return preparation system, which results in repeat customers and efficient preparation of customers tax returns, according to one embodiment.

BRIEF DESCRIPTION OF THE DRAWINGS

FIGS. 3A and 3B are example diagrams of issue resolution content that can be used by a tax return preparation system to crowdsource the detection of usability issues in user experience pages of the tax return preparation system, in accordance with one embodiment.

Figure 1:
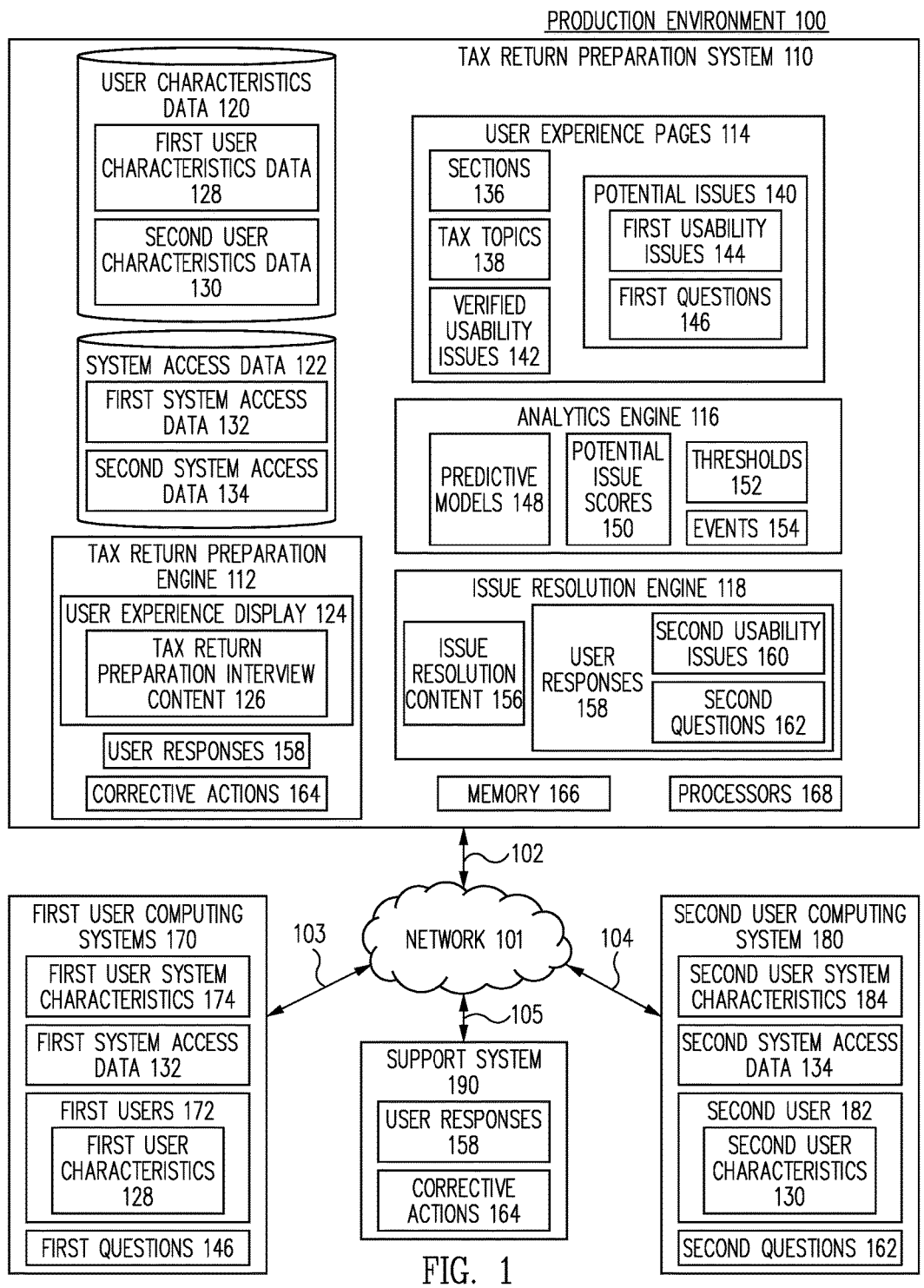
FIG. 1 is a block diagram of software architecture for crowdsourcing the detection of usability issues in a tax return preparation system, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, USER EXPERIENCE, and PROCESS sections herein describe systems and processes suitable for crowdsourcing the detection of usability issues in a tax return preparation system, according to various embodiments.

Introductory System

The present disclosure includes embodiments of methods and systems for crowdsourcing the detection of usability issues in a tax return preparation system. The tax return preparation system applies user characteristics data and/or system access data to one or more predictive models to identify when users are experiencing a potential issue in one or more user experience pages, according to one embodiment. The potential issue can be a question or can be the identification of a usability issue within one or more of the user experience pages, according to one embodiment. The one or more predictive models are trained to identify variations in normal system access data (e.g., navigation behavior) for users of the tax return preparation system and provide issue resolution content to the user, according to one embodiment. The issue resolution content is provided to: 1) help the user feel that the tax return preparation system is proactively attempting to resolve the potential issue for the user, 2) identify questions or usability issues identified by the user, and 3) obtain additional information about the questions or usability issues to improve the user experience for the current and subsequent users of the tax return preparation system, according to one embodiment.

Herein, a system (e.g., a software system) can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

Specific examples of systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other systems discussed herein, and/or known to those of skill in the art at the time of filing, and/or as developed after the time of filing. In one embodiment, data collected from users of TurboTax® and/or TurboTax® Online is not used with other service provider systems, such as Mint® or QuickBooks®.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given system as that system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the system in the production environment such as a data center, a cloud computing environment, a dedicated hosting environment, and/or one or more other computing environments in which one or more assets used by the application in the production environment are implemented; one or more computing systems or computing entities used to implement at least part of the system in the production environment; one or more virtual assets used to implement at least part of the system in the production environment; one or more supervisory or control systems, such as hypervisors, or other monitoring and management systems used to monitor and control assets and/or components of the production environment; one or more communications channels for sending and receiving data used to implement at least part of the system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the system in the production environment; one or more databases used to store data in the production environment; one or more internal or external services used to implement at least part of the system in the production environment; one or more backend systems, such as backend servers or other hardware used to process data and implement at least part of the system in the production environment; one or more modules/functions used to implement at least part of the system in the production environment; and/or any other assets/components making up an actual production environment in which at least part of the system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the system.

In various embodiments, one or more cloud computing environments are used to create, and/or deploy, and/or operate at least part of the system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features and elements provided or displayed to the user such as, but not limited to the following: data entry fields, question quality indicators, images, backgrounds, avatars, highlighting mechanisms, icons, buttons, controls, menus and any other features that individually, or in combination, create a user experience, as discussed herein, and/or as known in the art at the time of filing, and/or as developed after the time of filing.

As used herein, the terms "user experience page" and "user experience screen" are interchangeable in meaning and represent a changeable rendering or view of content that is provided to a user in the user experience display, according to one embodiment.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "predictive model" is used interchangeably with "analytics model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein the term "system access data" denotes data that represents user experience activities of a user during the user's interactions with a tax return preparation system, and the features and/or characteristics of those system access activities, according to various embodiments. The system access data is representative of the navigation behavior of a user in the user experience flow that is represented by combinations and/or sequences of multiple user experience pages. The system access data and the navigation behavior of a user are detectable and/or determinable by monitoring clickstream data, which includes data about which user experience pages are visited, in what order user experience pages are visited, navigation tool (e.g., mouse) hovering history, touchscreen and/or haptic feedback/technologies, and user experience element (e.g., button) selection history, according to one embodiment.

As used herein, the term "crowdsourcing" and its variants denote obtaining information or input for a particular task or project by enlisting the services of a number of people, either paid or unpaid, typically via the Internet, and includes obtaining services, ideas, or content by soliciting contributions from the number of people, according to one embodiment. Crowdsourcing, as disclosed herein, can be used to perform one task (e.g., error detection) by a group of people or users who are receiving one or more services (e.g., tax return preparation services) from a service provider, according to one embodiment.

As used herein, "usability issue" relates to an issue in the operation of one or more user experience pages of the tax return preparation system that affects at least some users, but not necessarily all users, according to one embodiment. A usability issue in one or more user experience pages of the tax return preparation system relates to how content is delivered (e.g., the language used in a description) and how information is received from users (e.g., the location of buttons/menus), according to one embodiment. A usability issue is a deficiency in one or more user experience pages that is experienced by some (but usually not all) users who land on a particular user experience page, according to one embodiment. The usability issue is not an error in user experience element design, placement or function within user experience pages, according to one embodiment. Rather, a usability issue relates to the interpretation (e.g., misunderstanding or misinterpretation) of properly functioning user experience elements, according to one embodiment.

Similar to a book or a movie, each user interprets media differently, so usability issues may affect some segments/groups of users while not affecting others, according to one embodiment. Usability issues are statistically detectable, based on the system access activities (e.g., browsing behavior) and/or user characteristics of users who visit the user experience pages of the tax return preparation system, and are manifest as system access activities that are typically associated with a confused user (e.g., repeatedly flipping back and forth between two or more user experience pages, repeatedly selecting a help menu from a particular user experience page, etc.), according to one embodiment. In one embodiment, a usability issue is another way of describing user error in the tax return preparation system.

As used herein, the term "issue resolution content" denotes user experience elements that provide or enable usability issue identification, usability issue description, usability issue resolution, question identification, question characterization, question description, question improvement, question quality indication, relevant question/answer combinations, and the like according to one embodiment.

Hardware Architecture

FIG. 1 is an example block diagram of a production environment 100 for crowdsourcing the detection of usability issues in one or more user experience pages in a tax return preparation system, in accordance with one embodiment. The production environment 100 illustrates example communications between a tax return preparation system and user computing systems, to describe embodiments of crowdsourcing the detection of usability issues in one or more user experience pages in a tax return preparation system. The production environment 100 includes a tax return preparation system 110, first user computing systems 170, a second user computing system 180, and a support system 190, configured to use crowdsourcing to detect usability issues in a tax return preparation system, according to one embodiment. The tax return preparation system 110 is communicatively coupled to the first user computing systems 170, the second user computing system 180, and the support system 190, through a network 101 and through communications channels 102, 103, 104, and 105, according to one embodiment.

The tax return preparation system 110 uses various features and functionality to progress users through a tax return preparation interview to prepare users' tax returns while concurrently crowdsourcing the detection of usability issues in user experience pages in the tax return preparation system, according to one embodiment. To support crowdsourcing the detection of usability issues in user experience pages in a tax return preparation system 110, the tax return preparation system includes a tax return preparation engine 112, user experience pages 114, an analytics engine 116, and an issue resolution engine 118, according to one embodiment.

The tax return preparation engine 112 delivers the user experience pages 114 to user computing systems in order to progress users through a tax return preparation interview, according to one embodiment. The tax return preparation engine 112 and/or the tax return preparation system 110 acquires user characteristics data 120 and system access data 122 during users' interactions with the tax return preparation system 110, according to one embodiment. The tax return preparation engine 112 applies the user characteristics data 120 and the system access data 122 to the analytics engine 116 to determine the likelihood that a user is experiencing a potential issue in one or more of the user experience pages 114, according to one embodiment. A potential issue can include the user stumbling upon a usability issue (e.g., cannot find the location of a "continue" button, even though it exists) in a user experience page, or the potential issue could be a question the user has about the content of one or more of the user experience pages 114, according to one embodiment.

If the analytics engine 116 determines that the user is experiencing a potential issue, the issue resolution engine 118 provides issue resolution content to the user through a user experience display (e.g., within or in addition to one or more of the user experience pages 114), according to one embodiment. The issue resolution engine 118 receives user responses from the user, in response to the question experience content, and determines if there is a usability issue or if the user has a question about the content of one or more of the user experience pages 114, according to one embodiment.

Even though the user experience pages 114 may include tens of thousands of unique pages, providing issue resolution content and receiving user responses during the tax return preparation interview enables the tax return preparation system 110 to employ crowdsourcing techniques to identify usability issues in user experience pages 114 and identify/answer user questions about the user experience pages 114, according to one embodiment. Because the tax return preparation system 110 may have tens of millions of users in a particular tax season, the tax return preparation system 110 can gather enough data samples to statistically support hypotheses of potential issues in user experience pages 114, according to one embodiment. The result of identifying and addressing these potential issues is increased user confidence in the tax return preparation system 110, and the acquisition of enough information about the potential issues to enable the tax return preparation system 110, the support system 190, and/or the service provider to improve the user experience pages 114 for subsequent users of the tax return preparation system, according to one embodiment. The ongoing evolution and/or improvement of the tax return preparation system 110 helps ensure current customer loyalty and helps promote future customer loyalty, by being responsive to the issues (e.g., user error) of current users and by potentially removing those potential issues from the user experience of future users of the tax return preparation system 110, according to one embodiment.

The tax return preparation system 110 uses the tax return preparation engine 112 to interact with one or more of the first user computing systems 170, the second user computing system 180, and/or the support system 190, according to one embodiment. The tax return preparation engine 112 provides a user experience display 124 to the user systems in order to deliver tax return preparation interview content 126, according to one embodiment. The tax return preparation interview content 126 corresponds with a tax return preparation interview that is used to prepare tax returns for users of the tax return preparation system 110, according to one embodiment. The tax return preparation engine 112 provides the user experience display 124 and the tax return preparation interview content 126 to acquire the user characteristics data 120, according to one embodiment. The tax return preparation engine 112 and/or the tax return preparation system 110 also receives, monitors, and/or stores the system access data 122, according to one embodiment. The system access data 122 is representative of system access activities performed by the user computing systems and/or the users while interacting with the tax return preparation system 110 during the tax return preparation interview, according to one embodiment. The system access data 122 and the corresponding system access activities represent user behavior or navigational behavior within the tax return preparation interview content 126 (e.g., within one or more of the user experience pages 114), according to one embodiment.

The tax return preparation engine 112 provides the user experience display 124 along with the tax return preparation interview content 126 in order to obtain the user characteristics data 120, to facilitate the preparation of tax returns for the users of the tax return preparation system 110, according to one embodiment. The user characteristics data 120 includes first user characteristics data 128 and second user characteristics data 130, according to one embodiment. The first user characteristics data 128 correspond with the first user computing systems 170, according to one embodiment.

The first user computing systems 170 are associated with the first users 172, according to one embodiment. The first user computing systems 170 represent hundreds, thousands, or millions of user computing systems used by the first users 172 to access the tax return preparation system 110 in order to prepare and/or file tax returns for the first users 172, according to one embodiment. Multiple ones of the first users 172 can use a single one of the first user computing systems 170 to prepare their tax returns, according to one embodiment. One of the first users 172 can use multiple ones of the first user computing systems 170 to prepare his/her tax return with the tax return preparation system 110, according to one embodiment.

The first user characteristics data 128 represents characteristics of each of the first users 172, according to one embodiment. In one embodiment, the first users 172 are users that have already prepared and/or filed a tax return with the tax return preparation system 110, according to one embodiment. The first user characteristics data 128 that are stored in the user characteristics data 120 are existing user characteristics or prior user characteristics, according to one embodiment. In one embodiment, at least some of the first users 172 are concurrently using the tax return preparation system 110 along with the second user 182, according to one embodiment.

The second user characteristics data 130 represent characteristics of the second user 182, who uses the second user computing system 180 to access the tax return preparation system 110 to prepare and/or file a tax return, according to one embodiment. The second user computing system 180 can represent multiple computing systems that are used by the second user 182 to provide the second user characteristics data 130 to the tax return preparation system 110, according to one embodiment. Providing the second user characteristics data 130 to the tax return preparation system 110 enables the tax return preparation system 110 to prepare a tax return for the second user 182, according to one embodiment.

The first user characteristics data 128 and the second user characteristics data 130 include a variety of attributes and/or information about the users of the tax return preparation system 110, according to one embodiment. The first user characteristics data 128 and the second user characteristics data 130 are represented by user characteristics data, according to one embodiment. The user characteristics data that is associated with the first user characteristics data 128 and with the second user characteristics data 130 includes, but is not limited to, data representing: browsing/navigation behavior within the tax return preparation system 110, type of web browser, type of operating system, manufacturer of computing system, whether the user's computing system is a mobile device or not, a user's name, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, individual retirement account ("IRA") distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in providing one or more financial services, according to various embodiments.

While the tax return preparation engine 112 provides the user experience display 124 and/or the tax return preparation interview content 126, the tax return preparation engine 112 and/or the tax return preparation system 110 also gathers system access data 122 from the first user computing systems 170 associated with the first users 172 and/or from the second user computing system 180 associated with the second user 182, according to one embodiment. The system access data 122 includes first system access data 132 and second system access data 134, according to one embodiment. The first system access data 132 represents system access activities performed by the first users 172, using the first user computing systems 170, while interacting with the tax return preparation system 110, according to one embodiment. The second system access data 134 represents the system access activities performed by the second user 182 within the tax return preparation system 110, using the second user computing system 180, according to one embodiment.

The first system access data 132 and the second system access data 134 include a variety of system access data that represents a variety of system access activities that represent user behavior within one or more user experience pages 114, within the tax return preparation interview, and/or within the tax return preparation system 110, according to one embodiment. The system access data 122 is stored as a table, a database, or some other data structure, according to one embodiment. The system access data 122 can include tens, hundreds, or thousands of features or characteristics associated with interactions between a user computing system and the tax return preparation system 110, according to one embodiment. The system access data 122 is data that represents system access activities and the features and/or characteristics of those activities, according to one embodiment. The system access activities may occur before, during, and/or after a client system establishes a communications channel/connection with the tax return preparation system 110, according to one embodiment. The system access data 122 includes, but is not limited to, data representing: the web browser of a user's computing system, the operating system of a user's computing system, the media access control ("MAC") address of the user's computing system, hardware identifiers of the user's computing system, user credentials used for logging in, a user account identifier, the duration that a user spends on a particular page or user interface element, how many times a user flips between 2 or more of the user experience pages 114, the number of logins in a particular period of time, the duration of login (e.g., a session with the tax return preparation system 110), the length of time it takes for a user to complete a tax return, the characteristics of the login (e.g., early, middle, late) within a predetermined time of year (e.g., tax season, time of a quarter, time of a day, time of a month, time of a year), the IP address of the user's computing system, tax return preparation characteristics, tax return filing characteristics, clickstream data, whether a navigation tool (e.g., a mouse) hovers over a help menu, how many times a navigation tool hovers over a help menu, and any other feature/characteristic of system access activity that is currently known at the time of filing or that may be known at a later time for interacting with a financial system, according to one embodiment.

The tax return preparation engine 112 and/or the tax return preparation system 110 also collects first user system characteristics 174 from the first user computing systems 170 and second user system characteristics 184 from the second user computing system 180, when the user computing systems 170 and 180 are used to access the tax return preparation system 110, according to one embodiment. The first user system characteristics 174 and the second user system characteristics 184 include, but are not limited to, hardware characteristics, software characteristics, browser characteristics, IP address characteristics, and the like, that are used by the tax return preparation system 110 to characterize and/or identify each of the first and second user computing systems 170 and 180, according to one embodiment. In one embodiment, the tax return preparation system 110 uses the first user system characteristics 174 and/or the second user system characteristics 184 to determine the likelihood that one or more users are experiencing or have experienced potential issues within one or more of the user experience pages 114, according to one embodiment.

The tax return preparation engine 112 populates the tax return preparation interview content 126 with at least some of the user experience pages 114, in order to progress users through a tax return preparation interview and to prepare and/or file tax returns for the users, according to one embodiment. The user experience pages 114 are collections of user experience elements that are displayed to users to inform users about the tax return preparation interview/process, to request information from the users, and to collect user characteristics data 120 from the users, according to one embodiment. The user experience pages 114 are associated with various sections 136 of a tax return preparation interview, according to one embodiment. The user experience pages 114 are associated with various tax topics 138, according to one embodiment. The tax return preparation engine 112 selects which ones of the user experience pages 114 to provide to the users at least partially based on which one of the sections 136 and/or which of the tax topics 138 are being presented to the users, according to one embodiment. Examples of the sections 136 include, but are not limited to, personal information, business, personal, state taxes, federal taxes, review, file, deductions, income, help, and the like, according to one embodiment. That is, the sections 136 are categories or groups of the user experience pages 114 that are provided to users during a tax return preparation interview, according to one embodiment.

The tax topics 138 include, but are not limited to, W-2, 1099, dividends, interest from loans, taxes exempt dividends, stocks, mutual funds, bonds, capital loss, capital gains, retirement plans, security, rentals, state and local tax refunds, business income, schedule K-1, farm income, business taxes, business expenses and credit, sale of business property, gambling winnings, alimony received, jury duty, child's income, sale of home, property taxes, mortgage insurance, home energy credits, mortgage interest credit, home buyer credit, earned income credit, child and dependent care, adoption credit, child tax credit, donations to charity, car registration fees, personal property taxes, education expenses, student loan interest, medical expenses, other income taxes, sales tax, foreign taxes, individual retirement account contributions, job-related expenses, and the like, according to various embodiments.

The user experience pages 114 include non-substantive characteristics, which include potential issues 140 and verified usability issues 142, according to one embodiment. The potential issues 140 represent usability issues associated with the use of one or more of the user experience pages 114 and represent questions that a user may have while progressing through a tax return preparation interview, according to one embodiment. The potential issues 140 can be one or more questions that arise for a user while the user is interacting with one or more user experience pages 114, according to one embodiment. The potential issues 140 can include usability issues that arise while navigating the user experience pages 114 that interfere with the user being able to perform one or more tasks (e.g., importing tax-related documents, exporting documents, entering data, navigating to subsequent user experience pages, etc.), according to one embodiment.

The verified usability issues 142 are subjective hindrances to users' experiences with one or more of the user experience pages 114 that are identified by the user, confirmed by the user, and/or reported to the tax return preparation system 110, according to one embodiment. In one embodiment, the verified usability issues 142 are usability issues that are identified by the user, reported to the tax return preparation system 110, and verified by one or more additional systems, e.g., the support system 190, according to one embodiment.

The potential issues 140 include first usability issues 144 and first questions 146 that correspond with usability issues and questions that are identified, and/or submitted by one or more of the first users 172 (e.g., prior users of the tax return preparation system), according to one embodiment. In other words, the first usability issues 144 and/or the first questions 146 represent usability issues and questions that are identified and/or submitted by prior users of the tax return preparation system 110, according to one embodiment. The first usability issues 144 and/or the first questions 146 represent usability issues and questions identified by users who are concurrently going through a tax return preparation interview, but who have already visited one or more of the user experience pages 114 that the second user 182 is currently experiencing a potential issue with, according to one embodiment. The first questions 146 can be received, stored, managed, and/or indexed by the issue resolution engine 118, according to one embodiment. The first usability issues 144 can be identified, and/or reported by the first users 172 through the issue resolution engine 118, according to one embodiment. The tax return preparation engine 112 selectively includes descriptions and/or representations of the first usability issues 144 and/or the first questions 146 to the second user 182 (e.g., the current user) of the tax return preparation system 110 in response to detecting that the second user 182 is experiencing one or more of the potential issues 140, according to one embodiment.

The tax return preparation system 110 uses the analytics engine 116 to analyze one or more of the user characteristics data 120 and the system access data 122 to determine the likelihood that the second user 182 is experiencing one or more potential issues 140 in one or more of the user experience pages 114, according to one embodiment. The analytics engine 116 uses the predictive models 148 to determine a likelihood that a current user is experiencing one or more of the potential issues 140, at least partially based on differences and/or similarities between the navigation behavior of a current user and the navigation behavior of previous users, according to one embodiment. That is, the predictive models 148 are trained using one or more of the first user characteristics data 128 and one or more of the first system access data 132, which are representative of characteristics and user behavior navigation behavior of the first users 172, according to one embodiment. The predictive models 148 are configured to generate the potential issue scores 150 in response to receiving and/or analyzing the second user characteristics data 130 and/or the second system access data 134 for the second user 182, according to one embodiment. The analytics engine 116 receives the user characteristics data 120 and/or the system access data 122 and applies the user characteristics data 120 and/or the system access data 122 to one or more predictive models 148, to generate one or more potential issue scores 150, according to one embodiment. The potential issue scores 150 represent the likelihood that one or more of the potential issues 140 are being experienced by the second user 182 in one or more of the user experience pages 114, according to one embodiment. The potential issue scores 150 include one or more scores that are a floating point number having a range of 0-1, according to one embodiment. The closer a potential issue score is to zero, the less likely that the navigation behavior of the user is representative of the second user 182 experiencing one or more of the potential issues 140, according to one embodiment. The closer a potential issue score is to 1, the more likely that the navigation behavior of the user is representative of the second user 182 experiencing one or more of the potential issues 140, according to one embodiment.

The predictive models 148 are trained based on the user characteristics and/or the system access data (e.g., the navigation behavior) of prior users and/or concurrent users of the tax return preparation system 110, according to one embodiment. The predictive models 148 are trained by applying one or more machine learning techniques to the first user characteristics data 128 and/or to the first system access data 132, according to one embodiment. The machine learning techniques include, but are not limited to, regression, logistic regression, decision trees, artificial neural networks, support vector machines, linear regression, nearest neighbor methods, distance based methods, naive Bayes, linear discriminant analysis, k-nearest neighbor algorithm, or another mathematical, statistical, logical, or relational algorithm to determine correlations or other relationships between navigational behavior in the user experience pages 114 and the likelihood of a user experiencing one or more of the potential issues 140, according to one embodiment. In one embodiment, the predictive models 148 are trained by determining average characteristics, mean characteristics, statistical distributions of characteristics, and/or one or more other statistical or mathematical characteristics of the first system access data 132 and/or the first user characteristics data 128, according to one embodiment. Accordingly, the predictive models 148 can generate potential issue scores 150 that represent deviations from "normal", average, or some other mathematical representation of users' navigational behavior within the tax return preparation system 110, according to one embodiment. In other words, the higher each of the potential issue scores 150 are, the more likely the current user's navigation behavior deviates from the "normal" or expected navigation behavior for a user who uses the tax return preparation system 110, according to one embodiment.

One or more of the predictive models 148 identify potential issues 140 (e.g., first usability issues 144) and/or new potential issues (e.g., second usability issues 160) by analyzing the system access data 122 with the context of the user characteristics data 120, according to one embodiment. In other words, one or more of the predictive models 148 identify usability issues by segmenting users to identify deviations in expected system access activities, according to one embodiment. One or more of the predictive models 148 include a decision tree that segments users based on some of the users' characteristics, and identifies deviations from expected behavior in the context of the users' particular segment, according to one embodiment. For example, one segment of users might include users who are at least 45 years old, are renters, and access the tax return preparation system 110 with a PC (instead of a Mac), according to one embodiment. Another segment of users might include users who use an Apple® product to access the tax return preparation system and are college graduates, according to one embodiment. Other segments of users may be based on employment status, type of employment, education level, zip code, home ownership status, whether English is a first or second language for the user, the country from which the user is access the tax return preparation system 110, and the like, that might be indicative of a likelihood of interpreting user experience elements in a similar manner, according to one embodiment. By applying user segmentation techniques to the analysis of the user characteristics data 120 and/or the system access data 122, the analytics engine 116 may be able to better crowdsource the detection of usability issues (appropriately to particular types of users) in user experience pages 114 of the tax return preparation system 110, according to one embodiment.

The predictive models 148 are trained to evaluate differences in users' navigation behavior each of the user experience pages 114, according to one embodiment. For example, if one of the user experience pages 114 takes many, most, or almost all users more time than any of the other user experience pages 114, then the analytics engine 116 and/or the engine used to train the predictive models 148 may generate an alert that the particular user experience page appears to be malfunctioning, according to one embodiment. Thus, the predictive models 148 and/or the process of training the predictive models 148 can be used to identify potential issues with one or more of the user experience pages 114, by comparing usage characteristics of individual ones of the user experience pages 114 to the user's characteristics of others of the user experience pages 114, according to one embodiment.

The analytics engine 116 applies one or more thresholds 152 to one or more of the potential issue scores 150 to determine a likelihood that the second user 182 is experiencing one of the potential issues 140, according to one embodiment. In response to one or more of the potential issue scores 150 exceeding one or more of the thresholds 152, the analytics engine 116 generates events 154, according to one embodiment. The events 154 are flags and/or alerts that are used to trigger one or more subsequent actions by the tax return preparation system 110, according to one embodiment. In one embodiment, the analytics engine 116 triggers one or more of the events 154 when at least one of the potential issue scores 150 exceeds at least one of the thresholds 152, according to one embodiment. The analytics engine 116 generates at least one of the events 154 when two or more of the potential issue scores 150 exceed two or more of the thresholds 152, according to one embodiment. The analytics engine 116 generates one or more of the events 154 when an average, a mean, or some other statistical or mathematical representation of two or more of the potential issue scores 150 exceed one or more of the thresholds 152, according to one embodiment.

The analytics engine 116 is included in the tax return preparation system 110, according to one embodiment. In one embodiment, the analytics engine 116 or the features/ functionality of the analytics engine 116 are included in an analytics engine that is independent of the tax return preparation system 110, according to one embodiment. The analytics system that includes the analytics engine 116 can share one or more resources with the tax return preparation system 110, e.g., within a service provider computing environment, according to one embodiment. In one embodiment, an analytics system includes one or more of the features of the analytics engine 116 and shares one or more resources with the tax return preparation system 110 and with the support system 190, according to one embodiment.

The issue resolution engine 118 includes issue resolution content 156 and user responses 158, according to one embodiment. The tax return preparation system 110 and/or the tax return preparation engine 112 executes and/or uses the issue resolution engine 118 in response to receiving and/or detecting one or more of the events 154, according to one embodiment. The issue resolution engine 118 is configured to insert issue resolution content 156 into one or more of the user experience pages 114, into the tax return preparation interview content 126, and/or into the user experience display 124, to enable viewing of the issue resolution content 156 by the second user 182, according to one embodiment. The issue resolution engine 118 causes the issue resolution content 156 to be displayed to the second user 182, in response to detecting and/or determining that the second user 182 is likely experiencing one or more potential issues 140, according to one embodiment.

The issue resolution engine 118 includes the features of the Question Optimizer$^{SM}$ of Intuit, Inc. of Mountain View, Calif., according to one embodiment. The issue resolution engine 118 is configured to receive a partial or fully formulated question from a user and provide suggestions on how to revise the question to increase the likelihood of a user receiving a response that satisfies the user, according to one embodiment. The issue resolution engine 118 provides suggestions on how to revise the question by providing personalized tips to guide users in formulating a better question, according to one embodiment. By providing advice on revising the question to formulate a better question, the issue resolution engine 118 (e.g., the Question Optimizer$^{SM}$) increases the likelihood of matching the user's question with a good answer, according to one embodiment. In one embodiment, the issue resolution engine analyzes search terms and the user's question and matches the user's question with other similar questions that have already been submitted/asked and that have already been responded to.

The issue resolution engine 118 is configured to populate the issue resolution content 156 with one or more of the first questions 146 that were submitted by one or more of the first users 172, according to one embodiment. The issue resolution engine 118 is configured to include one or more of the first questions 146 in the issue resolution content 156, along with corresponding responses to the first questions 146, according to one embodiment. The responses to the first questions 146 have been received by the community of users who provide, by crowdsourcing, responses to questions that are received by the issue resolution engine 118 for the tax return preparation system 110, according to one embodiment. In one embodiment, the issue resolution engine 118 populates the issue resolution content 156 based on one or more search terms submitted by the second user 182 in the user experience display 124, according to one embodiment. In other words, the issue resolution engine 118 receives user responses 158 for the second user 182 and dynamically (e.g., in real-time) populates the issue resolution content 156 with a list of one or more of the first questions 146 and/or a list of one or more of the first errors 144, to address the user's potential issue, according to one embodiment.

The issue resolution content 156 includes selection elements, such as user experience buttons, that enable the second user 182 to indicate whether the user has a question or whether the user has identified a usability issue with one or more user experience pages 114, according to one embodiment. The selection elements are included in a widget, a pop-up window, within one or more of the user experience pages 114, and/or within the user experience display 124 (e.g., adjacent to or external to one or more of the user experience pages 114), according to one embodiment.

The issue resolution content 156 includes one or more text boxes with instructional messages that show the user how to submit a question, according to one embodiment.

The issue resolution engine 118 receives the user responses 158, in response to providing the issue resolution content 156 to the second user 182, according to one embodiment. The user responses 158 include the second usability issues 160 and/or the second questions 162, according to one embodiment. In one embodiment, the user responses 158 are received from the second user 182 and include either the second usability issues 160 or the second questions 162, according to one embodiment. The second usability issues 160 are one or more usability issues that are identified by the second user 182 in one or more of the user experience pages 114, according to one embodiment. The second usability issues 160 are described, characterized, or otherwise identified simply by the second user 182 pressing a selection button that indicates that the second user 182 experienced a usability issue in one or more of the user experience pages 114, according to one embodiment. The issue resolution engine 118 gathers system access data 122 and/or gathers second system access data 134 that corresponds to system access activities by the second user 182, according to one embodiment. The issue resolution engine 118 uses an indication of the second usability issues 160, in combination with the second system access data 134, to characterize the nature of the second usability issues 160, according to one embodiment. For example, based on the user experience page visited when the user indicated that he experienced a usability issue, and based on the user's system access data (e.g., browsing history), the tax return preparation system 110 can provide information to support personnel (e.g., developers) that assist the support personnel in replicating and designing around the usability issue, according to one embodiment.

The issue resolution engine 118 receives the second questions 162 from the second user 182 via the second user computing system 180, in response to the issue resolution content 156, according to one embodiment. In one embodiment, the second questions 162 describe and/or characterize one or more of the second usability issues 160, according to one embodiment. In one embodiment, the second questions 162 are questions that are related to content and/or procedures for providing and/or receiving information in one or more of the user experience pages 114, according to one embodiment. An example of one of the second questions 162 may be "where do I enter my charitable contributions amount in the deductions section?" according to one embodiment.

The issue resolution engine 118 (e.g., the Question Optimizer$^{SM}$) is configured to apply one or more language analysis algorithms/techniques to the content of the of one or more of the second questions 162 determine the type of question, the content of the question, the nature of the question, and the like, according to one embodiment. The issue resolution engine 118 searches through one or more of the first questions 146 to define relevant ones of the first questions 146 and/or to provide one or more of the most relevant ones of the first questions 146 to the second user 182, in attempt to immediately or quickly respond to one or more of the second questions 162, according to one embodiment. By identifying and indicating to the second user 182 that the tax return preparation system 110 has identified that the second user 182 may have one or more potential issues 140, the tax return preparation system 110 builds the confidence of the second user 182 in the capabilities of the tax return preparation system 110, according to one embodiment. Furthermore, if the second user 182 is experiencing frustration, uncertainty, and/or doubt, the tax return preparation system 110 can reduce the user's negative feelings by proactively identifying that the user is struggling in the tax return preparation interview, offering assistance, indicating that other people are having a similar experience, and/or offering suggestions of actions were taken by other users, according to one embodiment.

In one embodiment, the issue resolution engine 118 provides issue resolution content 156 at least partially based on the navigation behavior and/or user characteristics of the second user 182. For example, the issue resolution engine 118 is configured to provide audio/visual support, particular message-based suggestions, and/or other user experience elements, based on which one of a number of segments of users the second user 182 is assigned to or associated with, according to one embodiment. In one embodiment, the issue resolution engine 118 segments users based on the system access data 122 (e.g., navigation behavior), whereas (in one embodiment) the analytics model 116 and/or the predictive models 148 segment users based on the user characteristics data 120. The issue resolution engine 118 scores the users based on the segmentation and based on the users' relative similarity to the segment to which the user belongs, according to one embodiment. The issue resolution engine 118 then customizes the assistance provided to the user during question submission, at least partially based on the score that is generated by the issue resolution engine 118, according to one embodiment.

The issue resolution engine 118 and/or the tax return preparation system 110 provides the one or more of the user responses 158 to the support system 190 in order to enable the support system 190 to determine and/or to provide one or more corrective actions 164, according to one embodiment. The support system 190 can be developer support, customer support, product manager support, and/or technical or non-technical support for the tax return preparation system 110, according to one embodiment. The support system 190 can include, but is not limited to, a queue of issues that are identified by users of the tax return preparation system 110, according to one embodiment. The support system 190 can prioritize the usability issues and/or other issues that are identified by users in the tax return preparation system 110 based on the types of issues that are identified, according to one embodiment. The support system 190 and/or the tax return preparation system 110 are configured to characterize the nature of the issues at least partially based on the user characteristics data 120, the system access data 122, and/or the user system characteristics of one or more of the user computing systems, according to one embodiment. The corrective actions 164 include, but are not limited to, software patches, a new version of the tax return preparation system 110, updated versions of one or more of the user experience pages 114, and/or a response to one or more of the second questions 162, according to one embodiment. Thus, the support system 190 can be used to fix usability issues that are in one or more of the user experience pages 114 and/or can be used to help work around the usability issues by responding to one or more of the second questions 162, according to one embodiment. For example, if the second user 182 determines that there are verified usability issues 142 in one or more of the user experience pages 114, the corrective actions 164 can include providing notification of a workaround (e.g., paper filing of one or more tax forms) to the second usability issue 160 and/or the second questions 162, according to one embodiment.

The tax return preparation system 110 is wholly or partially stored in memory 166 as one or more instructions that are executable by one or more processors 168, according to one embodiment. As described above, the analytics engine 116 and/or the issue resolution engine 118 can be hosted and/or operated by one or more systems that are at least partially independent of the tax return preparation system 110, and/or that are functionally independent of the tax return preparation system 110, even though they share one or more resources (e.g., memory 166, processors 168, and/or network-related equipment), according to one embodiment.

User Experience

Figure 2A:
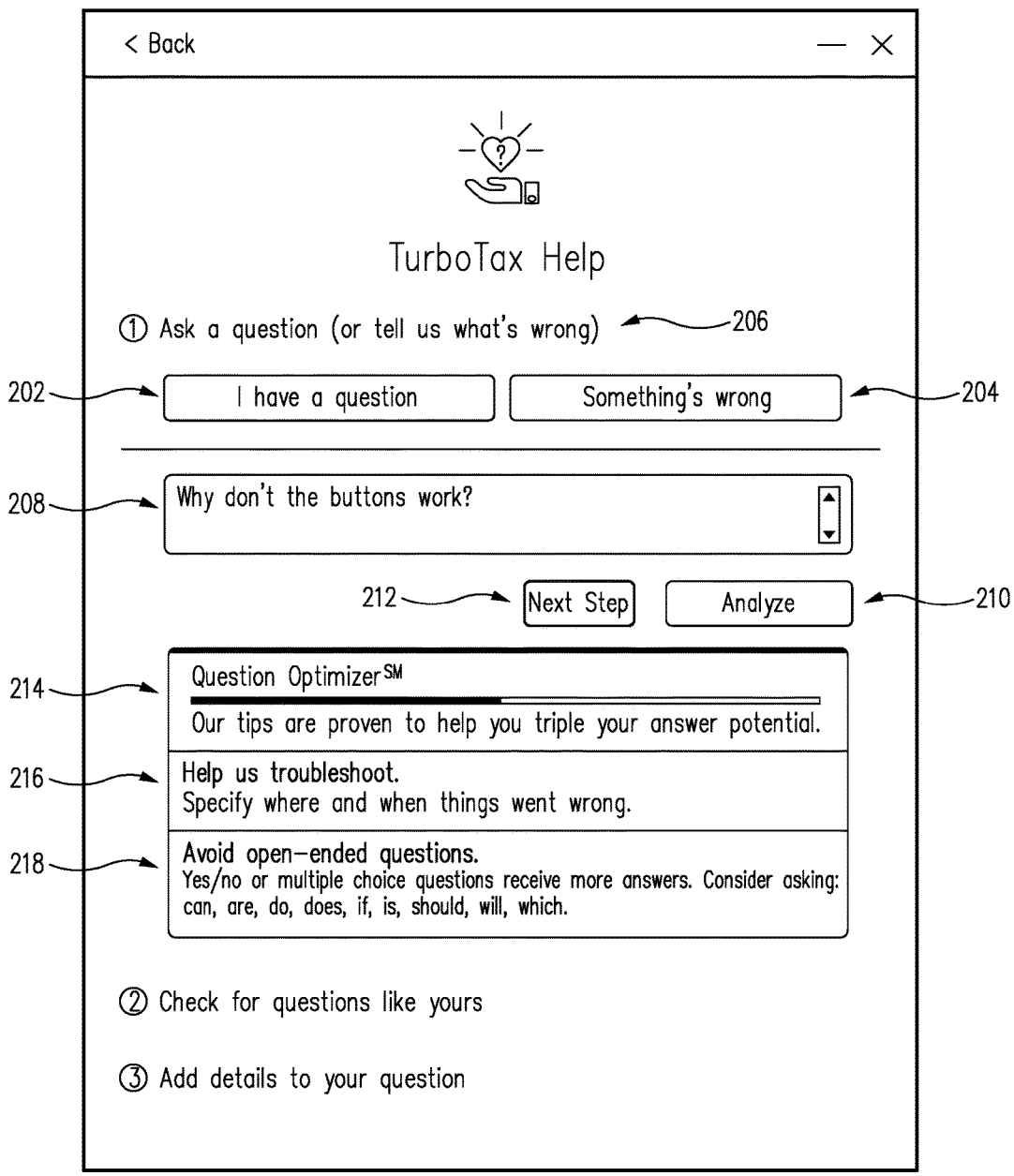
FIGS. 2A and 2B are example diagrams of issue resolution content that can be used by a tax return preparation system to crowdsource the detection of usability issues in user experience pages of the tax return preparation system, in accordance with one embodiment.
Figure 2B:
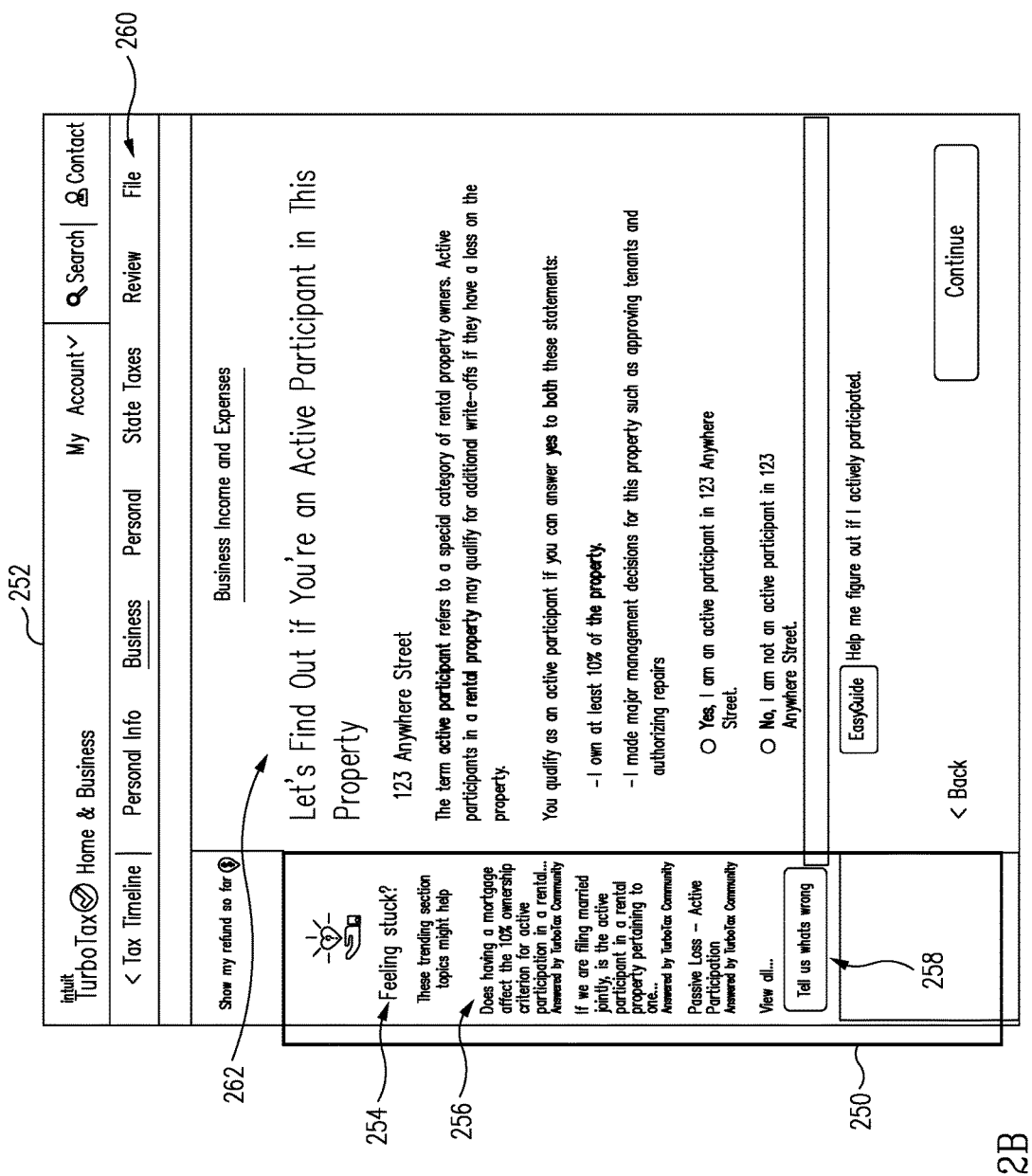

FIGS. 2A and 2B illustrate example implementations of issue resolution content that can be used by a tax return preparation system to crowdsource the detection of usability issues in user experience pages of the tax return preparation system, according to one embodiment. FIG. 2A illustrates a user experience page 200 and FIG. 2B illustrates a sidebar widget 250 as example implementations of issue resolution content, according to one embodiment.

The user experience page 200 includes various user experience elements that explain to the user how the tax return preparation system is attempting to resolve the user's potential issue, while concurrently providing user experience elements that obtain information from the user that can be used to characterize the potential issue, according to one embodiment. The user experience elements assist a user in characterizing the potential issue into a question or into a usability issue, according to one embodiment. An issue resolution engine assists the user in improving the question in order to improve responses received from an online community of people who respond to questions that arise from the use of the tax return preparation system, according to one embodiment. By helping the user describe, characterize or frame the question, the issue resolution engine is better able to provide the user with similar questions that have been submitted by prior users and provide responses that have been submitted for the similar questions, according to one embodiment. Upon receipt of the question from the user, the issue resolution engine broadcasts the user's question to an online community of people who respond to questions, in order to help the user obtain a response as quickly as possible, and without utilizing paid customer support resources of the service provider, according to one embodiment.

If the potential issue is a usability issue, the issue resolution engine uses the user experience elements to obtain details about the usability issue, to enable the tax return preparation system, the support system, or a representative of the service provider to review and/or design around the usability issue in the tax return preparation system, according to one embodiment. Enabling the tax return preparation system, the support system, or a representative of the service provider to review and/or design around the usability issue in the tax return preparation system reduces the likelihood that subsequent users of the tax return preparation system will also experience the usability issue, according to one embodiment. As a whole, proactively seeking to identify and resolve a user's potential issue (e.g. question or identified usability issue) can instill confidence and build trust in users for the tax return preparation system, even if the users inadvertently experience uncertainty by stumbling upon a usability issue in one or more of the user experience pages of a tax return preparation interview within a tax return preparation system, according to one embodiment.

The tax return preparation system displays the user experience page 200, in response to determining that the user is likely experiencing a potential issue during in the tax return preparation interview, according to one embodiment. The tax return preparation system detects and/or determines that a user has a potential issue by monitoring one or more user characteristics and/or one or more system access activities of the user, according to one embodiment. The tax return preparation system monitors one or more user characteristics and/or one or more system access activities by applying the user characteristics and/or the system access activities to one or more predictive models, according to one embodiment. Once a potential issue is detected for a user, the tax return preparation system embedding the user experience page 200 into a user experience display that is provided to a user computing system for the user, according to one embodiment.

The user experience page 200 includes a user selection element 202 and a user selection element 204, to identify whether the user has a question or has identified a usability issue, according to one embodiment. The user selection element 202 is a button that allows the user to indicate (e.g., by selecting the button) that the user has a question about the content of one or more user experience pages or about the tax return preparation process, according to one embodiment. The user selection element 204 is a button that allows the user to indicate (e.g., by selecting the button) that the user has identified a usability issue within one or more user experience pages, according to one embodiment. The user experience page 200 includes a description 206 of the purpose or function of the user selection elements 202 and 204, according to one embodiment.

The user experience page 200 includes a text input element 208, for receiving text input from the user, according to one embodiment. The text input element 208 is a text box, according to one embodiment. The text input element 208 enables a user to provide a description about the usability issue, a potential usability issue, or other issue (e.g., a malfunction) that the user experienced in one or more of the user experience pages of the tax return preparation interview, according to one embodiment.

The user experience page 200 uses the tax input element 208 to receive a question from the user, according to one embodiment. The user experience page 200 can be functionally coupled to an issue resolution engine that helps the user improve the user's question, in order to increase the likelihood that the user will receive an answer that the user is satisfied with, according to one embodiment. The issue resolution engine incorporates at least some of the features of the Question Optimizer[SM] from Intuit, Inc., according to one embodiment. The issue resolution engine applies language processing analytics to the search terms that are used to formulate the question in the text input element 208, and provides suggestions to the user on techniques that can be used to improve the strength of the user's question, according to one embodiment. The user experience page 200 includes a user selection element 210 and a user selection element 212 (e.g., buttons) to provide commands to the issue resolution engine to analyze the content submitted to the text input element 208, according to one embodiment. In one embodiment, the issue resolution engine analyzes the search terms that are entered into the text input element 208 in real-time, as the user enters the search terms, according to one embodiment. The user experience page 200 includes a progress bar 214 that displays the progress of the issue resolution engine in analyzing the search terms entered into the text input element 208 by user, according to one embodiment. The user experience page 200 includes instructions 216 and suggestions to 218, to enable the user to improve the questions submitted in the text input element 208, according to one embodiment. The user experience page 200 can provide additional features, such as allowing the user to check for questions that are similar to the question entered by the user, and can enable the user to add additional context or details that describe the circumstances surrounding the question entered into the text input element 208, according to one embodiment. The user experience page 200 can be navigated between various content using the user selection elements 210 and/or 212, according to one embodiment.

FIG. 2B illustrates the sidebar widget 250 within or adjacent to a user experience page 252, according to one embodiment. The sidebar widget is an example of issue resolution content that is provided to a user to support crowdsourcing the detection of usability issues in user experience pages in a tax return preparation interview within a tax return preparation system, according to one embodiment. The sidebar widget 250 includes an issue description 254, relevant questions 256, and a user selection element 258, according to one embodiment. The issue description 254 is in empathetic message that attempts to describe a feeling, an emotion, or situation that the tax return preparation system has detected as a potential issue for a user, according to one embodiment. The issue description 254 reads "Feeling Stuck?", according to one embodiment. The relevant questions 256 include one or more questions that are relevant to the content of the user experience page 252, according to one embodiment. If, for example, the content of the user experience page 252 is related to business income and expenses or real estate, the relevant questions 256 include questions about passive loss, rental property, or other business income and expenses, according to one embodiment. The user selection element 258 is a button that allows the user to indicate that the relevant questions 256 to not appear to satisfy the user's potential issue, according to one embodiment. In one embodiment, a user selecting the user selection element 258 causes the tax return preparation system to display the user experience page 200 (shown in FIG. 2A), according to one embodiment. The user experience page 252 includes a plurality of sections 260 that are related to a tax return preparation interview, according to one embodiment. The user experience page 252 includes tax return preparation interview content 262 that progresses the user through a tax return preparation interview to facilitate the preparation of a user's tax return, according to one embodiment.

The user experience page 200 (shown in FIG. 2A) and the sidebar widget 250 (shown in FIG. 2B) can be provided at any one of a number of sections 260 within a tax return preparation interview, according to one embodiment. For example, the user experience page 200 and/or the sidebar widget 250 can be used to resolve potential issues that the user might have for the personal information section, the business section, the personal section, the state taxes section, the review section, and/or the file section of a tax return preparation interview, according to one embodiment. Similarly, the user experience page 200 and/or the sidebar widget 250 can be used to resolve potential issues that the user might have on one or more individual user experience pages that may be presented during one or more of the sections 260 of the tax return preparation interview, according to one embodiment.

Figure 3A:
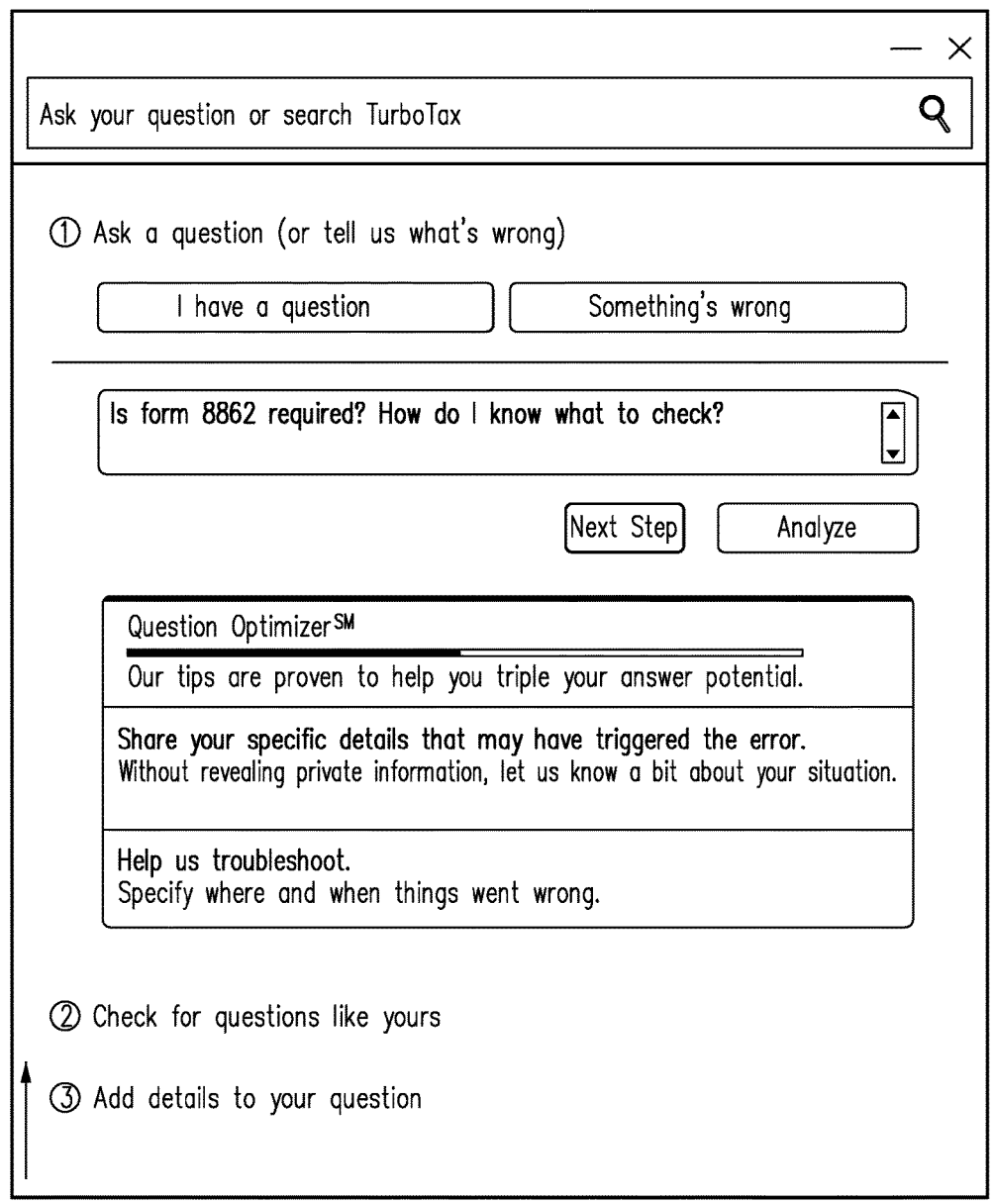

FIGS. 3A and 3B illustrate a user experience page 300 and a sidebar widget 350 (that is associated with a user experience page 352), as additional examples of issue resolution content that can be provided to a user to crowdsource the detection of usability issues in user experience pages of a tax return preparation interview within a tax return preparation system, according to one embodiment. The user experience page 300 and the sidebar widget 350 include similar (but different) features as the user experience page 200 and the sidebar widget 250, according to one embodiment.

Notably, the user experience page 300 and the sidebar widget 350 are associated with a review section of a tax return preparation interview, which can be a particularly frustrating and/or confusing section of the tax return preparation interview, according to one embodiment. Sometimes, a review section of a tax return preparation interview will ask a user to adjust information in one or more forms that have been incorrectly populated or filled out, even though the original version of the forms is not necessarily provided and/or displayed to users during a tax return preparation interview, according to one embodiment. By providing the user experience page 300 and/or the sidebar widget 350, the tax return preparation system proactively seeks to characterize, resolve, and/or recognize the potential issue that exists for a user, according to one embodiment. By proactively resolving and/or recognizing a potential issue for a user, the tax return preparation system can have an effect of reducing any frustration, uncertainty, and/or doubt that a user may be experiencing while near the completion of preparing and/or filing their tax return, according to one embodiment. Advantageously, the tax return preparation system provides the user experience page 300 and/or the sidebar widget 350 to users who display characteristics and/or symptoms of having a potential issue, in order to crowdsource the quality assurance testing and/or error detection of user experience pages within the tax return preparation system, according to one embodiment.

Process

Figure 4:
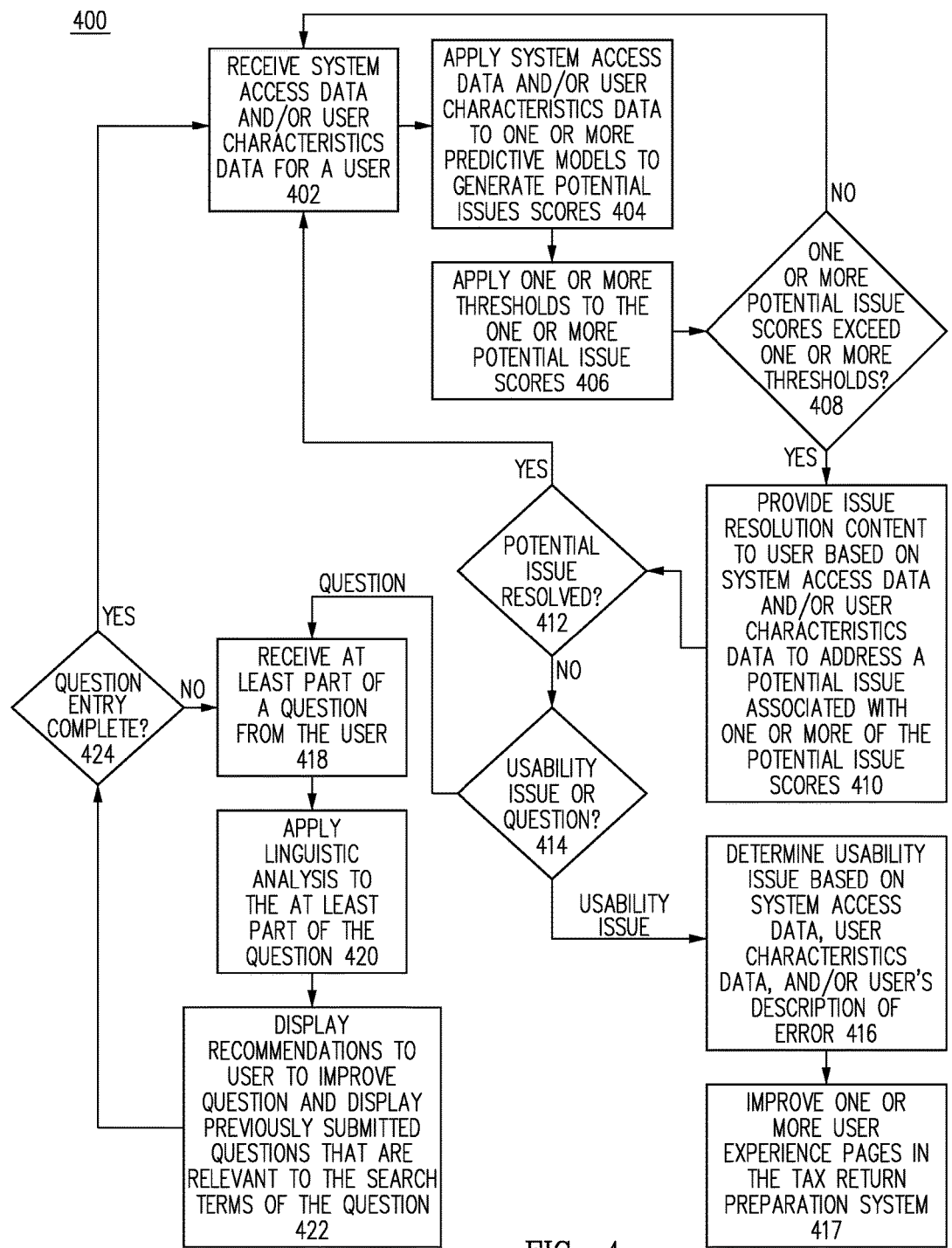
FIG. 4 is a flow diagram of a process for facilitating real-time crowdsourcing of the detection of usability issues in user experience pages of the tax return preparation system, in accordance with one embodiment.

FIG. 4 illustrates a process 400 for facilitating real-time crowdsourcing the detection of usability issues in user experience pages of a tax return preparation system, according to one embodiment.

At operation 402, the process receives system access data and/or user characteristics data for a user, according to one embodiment. In one embodiment, receiving system access data and/or user characteristics data includes accessing a database in which the system access data and/or the user characteristics data is stored, according to one embodiment. Operation 402 proceeds to operation 404, according to one embodiment.

At operation 404, the process applies system access data and/or user characteristics data to one or more predictive models to generate potential issue scores, according to one embodiment. Each of the potential issue scores represent a likelihood that a potential issue exists with one or more user experience pages in a tax return preparation system, according to one embodiment. Operation 404 proceeds to operation 406, according to one embodiment.

At operation 406, the process applies one or more thresholds to the one or more potential issue scores, according to one embodiment. Each of the potential issue scores can be a floating-point number having a range of 0-1, according to one embodiment. Exceeding one or more of the thresholds represent that there is a high likelihood that a user is having a potential issue with one or more of the user experience pages in a tax return preparation system, according to one embodiment. Operation 406 proceeds to operation 408, according to one embodiment.

At operation 408, the process determines whether one or more potential issue scores exceed one or more thresholds, according to one embodiment. If one or more of the potential issue scores exceed one or more of the thresholds, operation 408 proceeds to operation 410, according to one embodiment. If none of the one or more potential issue scores exceed one or more of the thresholds, then operation 408 proceeds back to operation 402, to enable the process to iteratively monitor the navigation behavior (e.g., represented by user characteristics data and/or system access data) of the user within tax return preparation system, according to one embodiment.

At operation 410, the process provides issue resolution content to the user based on system access data and/or user characteristics data to address a potential issue associated with one or more of the potential issue scores, according to one embodiment. The issue resolution content includes a number of user interface elements that notify the user that the tax return preparation system is aware that there may be a potential issue, that provides questions and resolutions that may be related to the user's potential issue, that request details and/or characteristics of the user's potential issue, and/or that provides suggestions/recommendations for formulating a user's question to improve the likelihood that the user will receive a satisfying response from a support community for the tax return preparation system, according to one embodiment. Operation 410 proceeds to operation 412, according to one embodiment.

At operation 412, the process determines if the potential issue was resolved, according to one embodiment. The process determines if a potential issue was resolved by determining if the user continues to another user experience page, by determining if the user continues to enter information in a particular user experience page, by determining if the user indicates that the issue was resolved (e.g., using a pop-up window or other text input box), and/or by determining if a user selects one or more buttons or other user experience elements that indicate that the user's potential issue has not been resolved, according to one embodiment. If the potential issue is resolved, the operation 412 proceeds to operation 402, according to one embodiment. If the potential issue is not resolved, operation 412 proceeds to operation 414, according to one embodiment.

At operation 414, the process determines whether the potential issue is a usability issue or a question, according to one embodiment. The process determines whether the potential issue is a usability issue or question by receiving a user's selection that identifies the potential issue as a usability issue or question, according to one embodiment. In one embodiment, the user selects a button that indicates that the user's potential issue is a usability issue in one or more of the user experience pages, according to one embodiment. In one embodiment, the user selects a button that indicates that the user's potential issue is a question regarding tax returns or the content of one or more user experience pages, according to one embodiment. If the potential issue is a usability issue, operation 414 proceeds to operation 416, according to one embodiment. If the potential issue is a question, operation 414 proceeds to operation 418, according to one embodiment.

At operation 416, the process determines the usability issue based on system access data, user characteristics data, and/or the user's description of the error, according to one embodiment. Operation 416 proceeds to operation 417, according to one embodiment.

At operation 417, the process improves one or more user experience pages in the tax return preparation system, according to one embodiment. The process improves one or more of the user experience pages by releasing a new version of one or more experience pages and/or a new version of all or part of the tax return preparation system, according to one embodiment. The process improves one or more of the user experience pages by providing additional instructions on the affected/relevant user experience pages, according to one embodiment.

At operation 418, the process receives at least part of a question from the user, according to one embodiment. The process receives at least part of a question as a user enters search terms into a text box or other user experience input element, according to one embodiment. Operation 418 proceeds to operation 420, according to one embodiment.

At operation 420, the process applies linguistic analysis to the at least part of the question, according to one embodiment. The process uses an issue resolution engine to identify and/or characterize the substance of the question being entered by user, according to one embodiment. Operation 420 proceeds to operation 422, according to one embodiment.

At operation 422, the process displays recommendations to the user to improve the question and displays previously submitted questions that are relevant to the search terms of the question, according to one embodiment. The recommendations can include, but are not limited to, changing the first term of a question, converting an open question to a closed (i.e., yes/no or Boolean), using fewer search terms, using additional search terms, using different search terms, and the like, according to one embodiment. Operation 422 proceeds to operation 424, according to one embodiment.

At operation 424, the process determines whether the question entry is complete, according to one embodiment. The question entry is determined complete if the user selects a button or other user interface element that indicates that the user has completed submission of his or her question, according to one embodiment. If the question entry is complete, operation 424 proceeds to operation 402, according to one embodiment. If the question entry is incomplete, operation 424 proceeds to operation 418, according to one embodiment.

Figure 5:
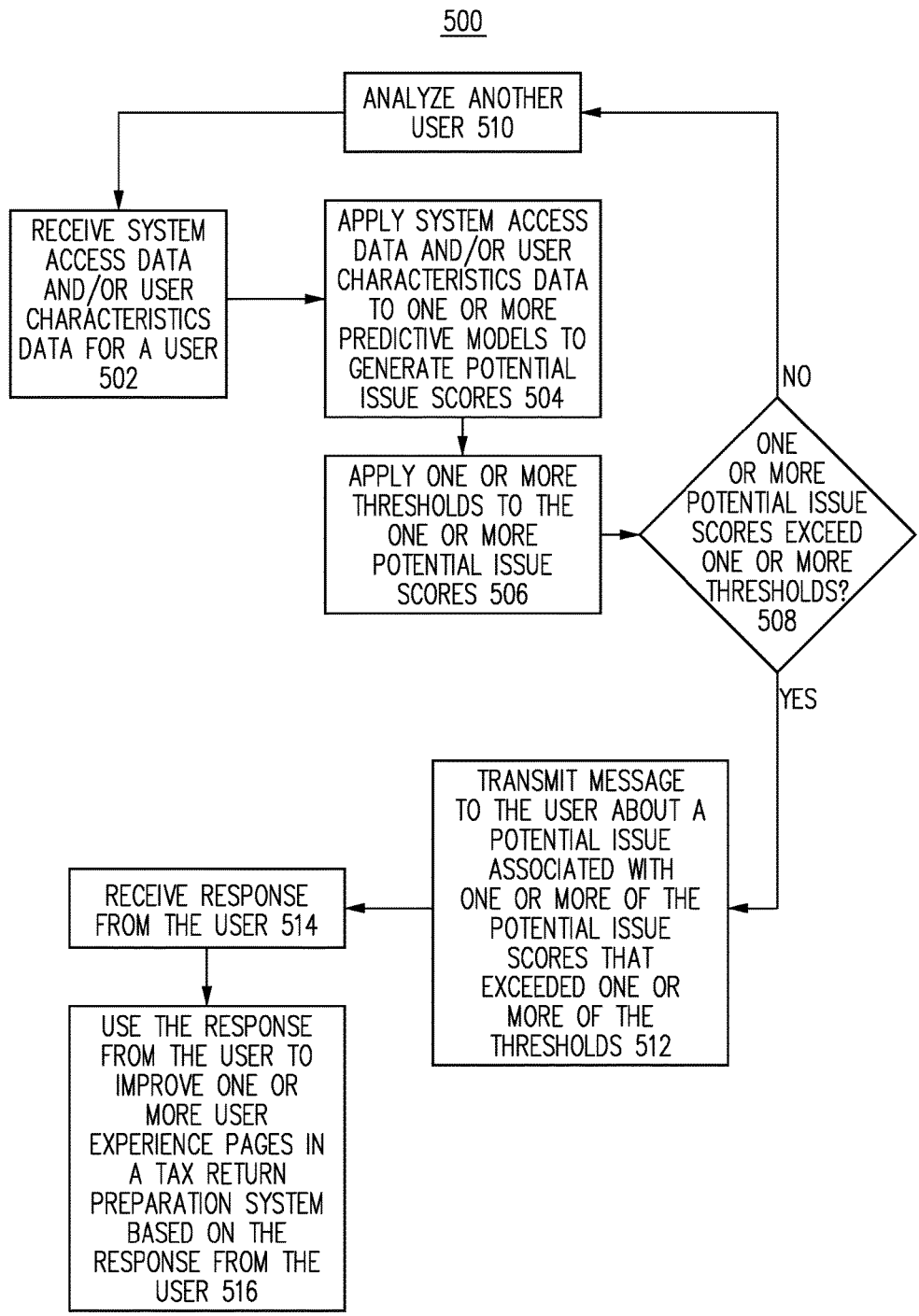
FIG. 5 is a flow diagram of a process for facilitating crowdsourcing the detection of usability issues in user experience pages of a tax return preparation system using post-processing of logged data, in accordance with one embodiment.

FIG. 5 illustrates a process 500 for facilitating crowd-sourcing the detection of usability issues in user experience pages of a tax return preparation system, for example, using post-processing techniques on system access data and/or user characteristics data, according to one embodiment.

At operation 502, the process receives system access data and/or user characteristics data for a user, according to one embodiment. Operation 502 proceeds to operation 504, according to one embodiment.

At operation 504, the process applies system access data and/or user characteristics data to one or more predictive models to generate potential issue scores, according to one embodiment. Operation 504 proceeds to operation 506, according to one embodiment.

At operation 506, the process applies one or more thresholds to the one or more potential issue scores, according to one embodiment. Operation 506 proceeds to operation 508, according to one embodiment.

At operation 508, the process determines if one or more potential issue scores exceed one or more thresholds, according to one embodiment. If one or more of the potential issue scores does not exceed one or more of the threshold, operation 508 proceeds to operation 510, according to one embodiment. If one or more of the potential issue scores exceed one or more of the thresholds, operation 508 proceeds to operation 512, according to one embodiment.

At operation 510, the process analyzes another user, according to one embodiment. Operation 510 proceeds to operation 502, according to one embodiment.

At operation 512, the process transmits a message to the user about a potential issue associated with one or more of the potential issue scores that exceeded one or more of the thresholds, according to one embodiment. Due to post-processing lag times or delays, the tax return preparation system may not be able to notify the user of the identified potential issue while the user is still logged into a session in the tax return preparation system, if the user experienced a potential issue, according to one embodiment. The tax return preparation system or a notification system associated with the tax return preparation system sends an email, text message, or some of telecommunications message about the potential issue and requests information about the potential issue, according to one embodiment. The message includes a hyperlink that returns the user back to the user experience page where the user experienced the usability issue, to allow the user to complete his/her tax return, according to one embodiment. Operation 512 proceeds to operation 514, according to one embodiment.

At operation 514, the process receives a response from the user, according to one embodiment. The user can respond to email, respond to a text message, log into the tax return preparation system, and the like, according to one embodiment. Operation 514 proceeds to operation 516, according to one embodiment.

At operation 516, the process uses the response from the user to improve one or more user experience pages in a tax return preparation system based on the response from the user, according to one embodiment.

Figure 6:
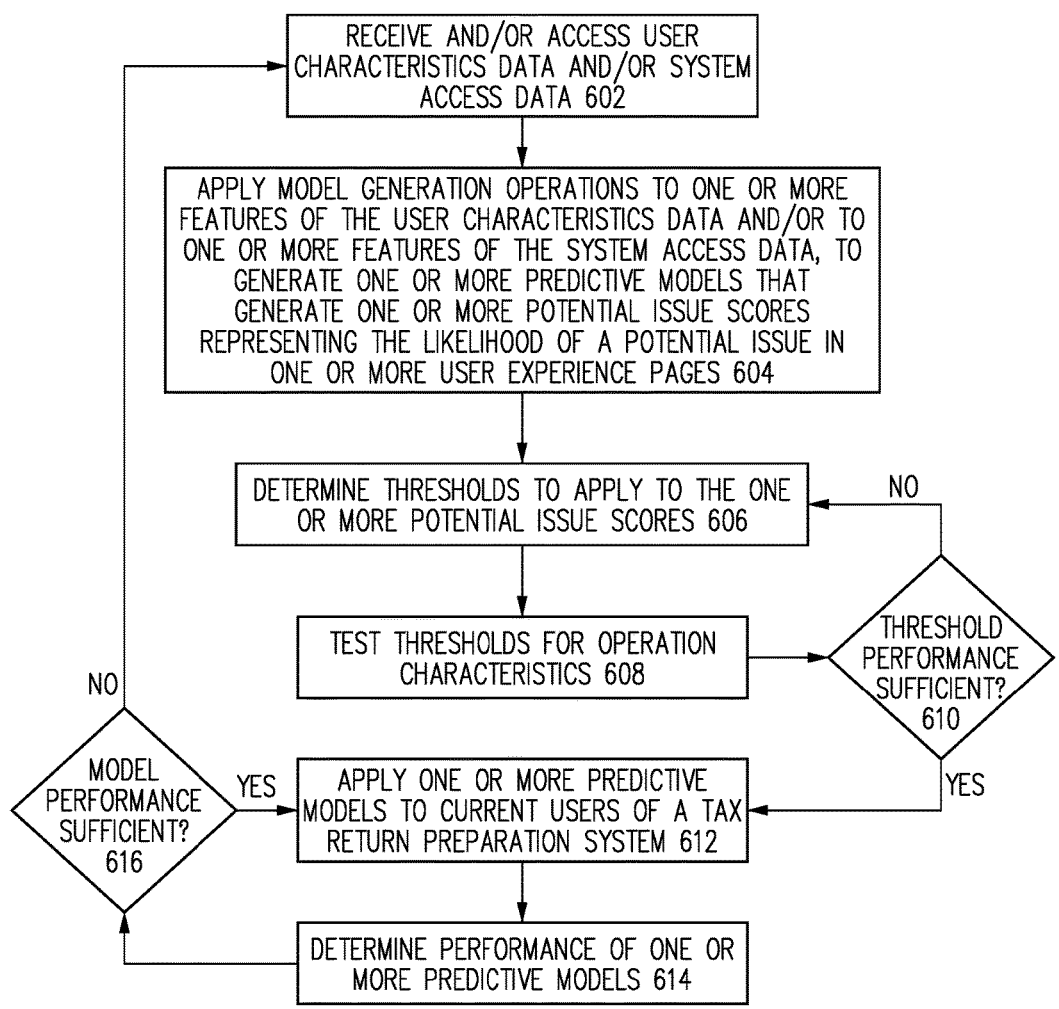
FIG. 6 is a flow diagram for training one or more predictive models to identify when a user of a tax return preparation system is experiencing a potential issue with one or more user experience pages in the tax return preparation system, in accordance with one embodiment.

FIG. 6 illustrates a process 600 for training one or more predictive models to identify when a user of a tax return preparation system is experiencing a potential issue with one or more user experience pages in the tax return preparation system, according to one embodiment.

At operation 602, the process receives and/or accesses user characteristics data and/or system access data, according to one embodiment. The user characteristics data represents characteristics of a user of the tax return preparation system, according to one embodiment. The system access data represents one or more system access activities (e.g., the user's behavior within the tax return preparation system), according to one embodiment. Operation 602 proceeds to operation 604, according to one embodiment.

At operation 604, the process applies model generation operations to one or more features of the user characteristics data and/or to one or more features of the system access data, to generate one or more predictive models to generate one or more potential issue scores representing a likelihood of a potential issue in one or more user experience pages, according to one embodiment. In one embodiment, applying model generation operations defines a decision tree with decision nodes that segment users based on user characteristics and/or system access activities of the users. In one embodiment, the normal or expected system access activities of the users (e.g., the browsing behavior) is at least partially based on the segment that a user is assigned or associated with. Operation 604 proceeds to operation 606, according to one embodiment.

At operation 606, the process determines thresholds to apply to the one or more potential issue scores, according to one embodiment. Operation 606 proceeds to operation 608, according to one embodiment.

At operation 608, the process tests thresholds for operational characteristics, according to one embodiment. Examples of operational characteristics include, but not limited to, a false-positive rate, a false-negative rate, and the like, according to one embodiment. Operation 608 proceeds to operation 610, according to one embodiment.

At operation 610, the process determines if the threshold performance is sufficient, according to one embodiment. If a threshold performance is insufficient, the operation 610 proceeds to operation 606, according to one embodiment. If the threshold performance is sufficient, operation 610 proceeds to operation 612, according to one embodiment.

At operation 612, the process applies one or more predictive models to current users of the tax return preparation system, according to one embodiment. Operation 612 proceeds to operation 614, according to one embodiment.

At operation 614, the process determines performance of one or more of the predictive models, according to one embodiment. Operation 614 proceeds to operation 616, according to one embodiment.

At operation 616, the process determines if model performance is sufficient, according to one embodiment. If model performance is insufficient (e.g., it is not accurately identifying users who experience issues with user experience pages), operation 616 proceeds to operation 602, according to one embodiment. If model performance is sufficient, operation 616 proceeds to operation 612, to continue using one or more of the current models, according to one embodiment.

Figure 7A:
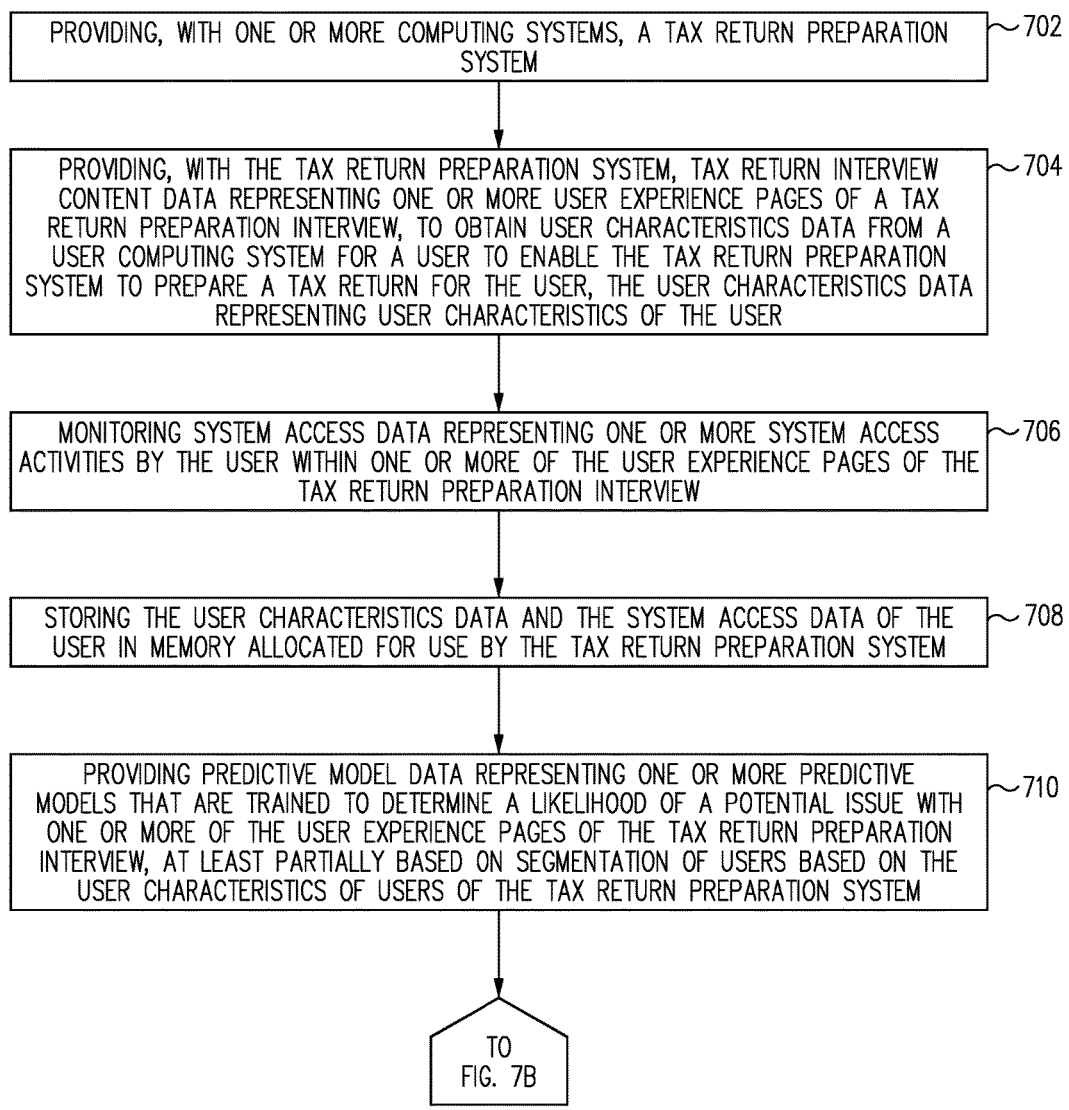
FIGS. 7A and 7B are a flow diagram for detecting usability issues in one or more user experience pages of a tax return preparation system, in accordance with one embodiment.
Figure 7B:
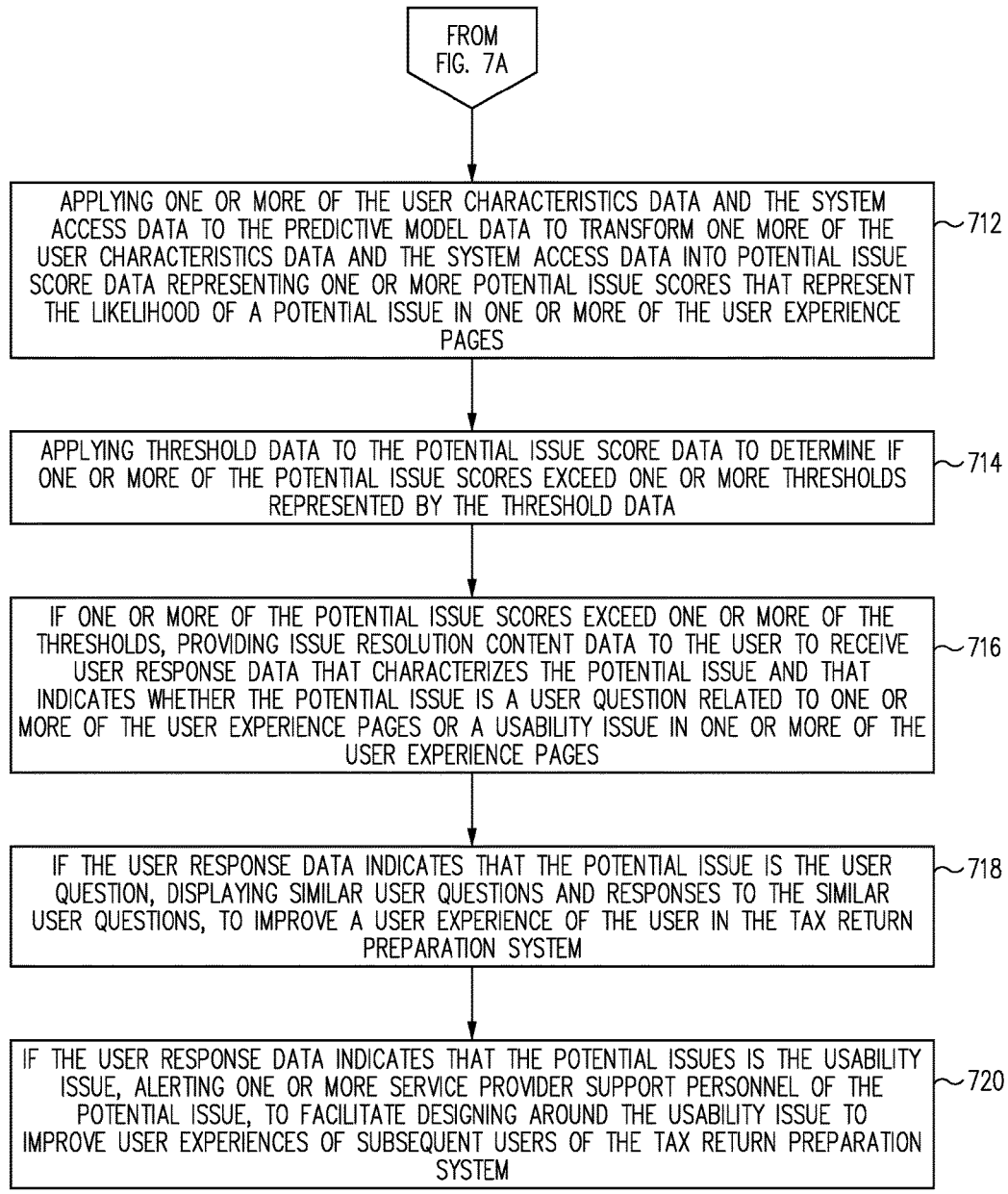

FIGS. 7A and 7B illustrate a process 700 of detecting usability issues in one or more user experience pages of a tax return preparation system, according to one embodiment.

At operation 702, the process includes providing, with one or more computing systems, a tax return preparation system, according to one embodiment. Operation 702 proceeds to operation 704, according to one embodiment.

At operation 704, the process includes providing, with the tax return preparation system, tax return interview content data representing one or more user experience pages of a tax return preparation interview, to obtain user characteristics data from a user computing system for a user to enable the tax return preparation system to prepare a tax return for the user, the user characteristics data representing user characteristics of the user, according to one embodiment. Operation 704 proceeds to operation 706, according to one embodiment.

At operation 706, the process includes monitoring system access data representing one or more system access activities by the user within one or more of the user experience pages of the tax return preparation interview, according to one embodiment. Operation 706 proceeds to operation 708, according to one embodiment.

At operation 708, the process includes storing the user characteristics data and the system access data of the user in memory allocated for use by the tax return preparation system, according to one embodiment. Operation 708 proceeds to operation 710, according to one embodiment.

At operation 710, the process includes providing predictive model data representing one or more predictive models that are trained to determine a likelihood of a potential issue with one or more of the user experience pages of the tax return preparation interview, at least partially based on segmentation of users based on the user characteristics of users of the tax return preparation system, according to one embodiment. Operation 710 proceeds to operation 712, according to one embodiment.

At operation 712, the process includes applying one or more of the user characteristics data and the system access data to the predictive model data to transform one or more of the user characteristics data and the system access data into potential issue score data representing one or more potential issue scores that represent the likelihood of a potential issue in one or more of the user experience pages, according to one embodiment. Operation 712 proceeds to operation 714, according to one embodiment.

At operation 714, the process includes applying threshold data to the potential issue score data to determine if one or more of the potential issue scores exceed one or more thresholds represented by the threshold data, according to one embodiment. Operation 714 proceeds to operation 716, according to one embodiment.

At operation 716, the process includes, if one or more of the potential issue scores exceed one or more of the thresholds, providing issue resolution content data to the user to receive user response data that characterizes the potential issue and that indicates whether the potential issue is a user question related to one or more of the user experience pages or a usability issue in one or more of the user experience pages, according to one embodiment. Operation 716 proceeds to operation 718, according to one embodiment.

At operation 718, the process includes, if the user response data indicates that the potential issue is the user question, displaying similar user questions and responses to the similar user questions, to improve a user experience of the user in the tax return preparation system, according to one embodiment. Operation 718 proceeds to operation 720, according to one embodiment.

At operation 720, the process includes, if the user response data indicates that the potential issues is the usability issue, alerting one or more service provider support personnel of the potential issue, to facilitate designing around the usability issue to improve user experiences of subsequent users of the tax return preparation system, according to one embodiment.

As noted above, the specific illustrative examples discussed above are but illustrative examples of implementations of embodiments of the method or process for crowdsourcing the detection of usability issues in a tax return preparation system. Those of skill in the art will readily recognize that other implementations and embodiments are possible. Therefore the discussion above should not be construed as a limitation on the claims provided below.

By crowdsourcing the detection of usability issues in a tax return preparation system, implementation of embodiments of the present disclosure allows for significant improvement to the fields of software development, electronic tax return preparation, data collection, and data processing, according to one embodiment. As illustrative examples, by crowdsourcing the detection of usability issues in a tax return preparation system, more combinations and permutations of features can be deployed more rapidly with less rigorous testing, saving both time and cost associated with testing every probable sequence or combination of user experience pages in the tax return preparation system, according to one embodiment. As a result, embodiments of the present disclosure allow for reduced use of processor cycles, memory, and power consumption associated with testing potentially tens of thousands of user experience page combinations prior to each new revision or release of a tax return preparation system, according to one embodiment. Consequently, computing and communication systems implementing and/or providing the embodiments of the present disclosure are transformed into more operationally efficient devices and systems.

Because usability issues in user experience pages of a tax return preparation system is an Internet-centric and computing system-centric problem, the solutions to these problems are not abstract ideas.

In addition to improving overall computing performance, by crowdsourcing the detection of usability issues in a tax return preparation system, implementation of embodiments of the present disclosure represent a significant improvement to the field of efficient deployment of software systems. As a result, service providers can accomplish more development with less manpower and/or deploy additional technology under shorter integration delays, according to one embodiment. Additionally, by crowdsourcing the detection of usability issues in a tax return preparation system, including proactively working to resolve customer issues or potential issues, the disclosed embodiments help maintain and/or build trust and therefore loyalty in the tax return preparation system, which results in repeat customers and efficient preparation of customers tax returns, according to one embodiment.

In accordance with an embodiment, a computing system implemented method detects usability issues in one or more user experience pages of a tax return preparation system. The method includes providing, with one or more computing systems, a tax return preparation system, according to one embodiment. The method includes providing, with the tax return preparation system, tax return interview content data representing one or more user experience pages of a tax return preparation interview, to obtain user characteristics data from a user computing system for a user to enable the tax return preparation system to prepare a tax return for the user, the user characteristics data representing user characteristics of the user, according to one embodiment. The method includes monitoring system access data representing one or more system access activities by the user within one or more of the user experience pages of the tax return preparation interview, according to one embodiment. The method includes storing the user characteristics data and the system access data of the user in memory allocated for use by the tax return preparation system, according to one embodiment. The method includes providing predictive model data representing one or more predictive models that are trained to determine a likelihood of a potential issue with one or more of the user experience pages of the tax return preparation interview, at least partially based on segmentation of users based on the user characteristics of users of the tax return preparation system, according to one embodiment. The method includes applying one or more of the user characteristics data and the system access data to the predictive model data to transform one or more of the user characteristics data and the system access data into potential issue score data representing one or more potential issue scores that represent the likelihood of a potential issue in one or more of the user experience pages, according to one embodiment. The method includes applying threshold data to the potential issue score data to determine if one or more of the potential issue scores exceed one or more thresholds represented by the threshold data, according to one embodiment. The method includes if one or more of the potential issue scores exceed one or more of the thresholds, providing issue resolution content data to the user to receive user response data that characterizes the potential issue and that indicates whether the potential issue is a user question related to one or more of the user experience pages or a usability issue in one or more of the user experience pages, according to one embodiment. The method includes, if the user response data indicates that the potential issue is the user question, displaying similar user questions and responses to the similar user questions, to improve a user experience of the user in the tax return preparation system, according to one embodiment. The method includes, if the user response data indicates that the potential issues is the usability issue, alerting one or more service provider support personnel of the potential issue, to facilitate designing around the usability issue to improve user experiences of subsequent users of the tax return preparation system, according to one embodiment.

In accordance with an embodiment, a computing system implemented method detects usability errors in one or more user experience pages of a tax return preparation system. The method includes providing, with one or more computing systems, a tax return preparation system, according to one embodiment. The method includes providing, with the tax return preparation system, tax return interview content data representing one or more user experience pages of a tax return preparation interview, to obtain user characteristics data from a user computing system for a user to enable the tax return preparation system to prepare a tax return for the user, according to one embodiment. The method includes receiving system access data representing one or more system access activities by the user within one or more of the user experience pages of the tax return preparation interview, according to one embodiment. The method includes storing the user characteristics data and the system access data of the user in memory allocated for use by the tax return preparation system, according to one embodiment. The method includes providing predictive model data representing one or more predictive models that are trained to determine a likelihood of a potential issue with one or more of the user experience pages of the tax return preparation interview, at least partially based on the system access data and segmentation of users based on user characteristics of the users, according to one embodiment. The method includes applying the system access data to the predictive model data to generate potential issue score data at least partially based on the system access data, the predictive model data representing one or more potential issue scores that represent the likelihood of a potential issue in one or more of the user experience pages, according to one embodiment. The method includes providing issue resolution content data to the user to notify the user that the tax return preparation system detects a potential issue for the user within the tax return preparation interview, at least partially based on one or more of the potential issue scores, according to one embodiment. The method includes receiving user response data from the user in response to providing the issue resolution data to the user, the user response data representing a user response that characterizes the potential issue as a user question with content of one or more of the user experience pages or as a usability issue in one or more of the user experience pages, according to one embodiment. The method includes, if the user response data indicates that the potential issue is the user question, displaying similar user questions and responses to the similar user questions, to improve a user experience of the user in the tax return preparation system, according to one embodiment. The method includes, if the user response data indicates that the potential issue is the usability issue, alerting one or more service provider support personnel of the potential issue, to facilitate addressing the usability issue and to improve user experiences of subsequent users of the tax return preparation system, according to one embodiment.

In accordance with an embodiment, a system detects usability issues in one or more user experience pages of a tax return preparation system. The system includes one or more processors, according to one embodiment. The system includes memory having instructions which, if executed by the one or more processors, cause the one or more processors to perform a process for detecting usability issues in one or more user experience pages of a tax return preparation system, according to one embodiment. The process includes providing the tax return preparation system, according to one embodiment. The process includes providing, with the tax return preparation system, tax return interview content data representing one or more user experience pages of a tax return preparation interview, to obtain user characteristics data from a user computing system for a user to enable the tax return preparation system to prepare a tax return for the user, the user characteristics data representing user characteristics of the user, according to one embodiment. The process includes monitoring system access data representing one or more system access activities by the user within one or more of the user experience pages of the tax return preparation interview, according to one embodiment. The process includes storing the user characteristics data and the system access data of the user in memory allocated for use by the tax return preparation system, according to one embodiment. The process includes providing predictive model data representing one or more predictive models that are trained to determine a likelihood of a potential issue with one or more of the user experience pages of the tax return preparation interview, at least partially based on segmentation of users based on the user characteristics of users of the tax return preparation system, according to one embodiment. The process includes applying one or more of the user characteristics data and the system access data to the predictive model data to transform one or more of the user characteristics data and the system access data into potential issue score data representing one or more potential issue scores that represent the likelihood of a potential issue in one or more of the user experience pages, according to one embodiment. The process includes applying threshold data to the potential issue score data to determine if one or more of the potential issue scores exceed one or more thresholds represented by the threshold data, according to one embodiment. The process includes, if one or more of the potential issue scores exceed one or more of the thresholds, providing issue resolution content data to the user to receive user response data that characterizes the potential issue and that indicates whether the potential issue is a user question related to one or more of the user experience pages or a usability issue in one or more of the user experience pages, according to one embodiment. The process includes, if the user response data indicates that the potential issue is the user question, displaying similar user questions and responses to the similar user questions, to improve a user experience of the user in the tax return preparation system, according to one embodiment. The process includes, if the user response data indicates that the potential issues is the usability issue, alerting one or more service provider support personnel of the potential issue, to facilitate designing around the usability issue to improve user experiences of subsequent users of the tax return preparation system, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for detecting usability issues in one or more user experience pages of a tax return preparation system, comprising:

providing, with one or more computing systems, a tax return preparation system;

providing, with the tax return preparation system, tax return interview content data representing one or more user experience pages of a tax return preparation interview, to obtain user characteristics data from a user computing system for a user to enable the tax return preparation system to prepare a tax return for the user, the user characteristics data representing user characteristics of the user;

monitoring system access data representing one or more system access activities by the user within one or more of the user experience pages of the tax return preparation interview;

storing the user characteristics data and the system access data of the user in memory allocated for use by the tax return preparation system;

providing predictive model data representing one or more predictive models that are trained to determine a likelihood of a potential issue with one or more of the user experience pages of the tax return preparation interview, at least partially based on segmentation of users based on the user characteristics of users of the tax return preparation system;

applying one or more of the user characteristics data and the system access data to the predictive model data to transform one or more of the user characteristics data and the system access data into potential issue score data representing one or more potential issue scores that represent the likelihood of a potential issue in one or more of the user experience pages;

applying threshold data to the potential issue score data to determine if one or more of the potential issue scores exceed one or more thresholds represented by the threshold data;

if one or more of the potential issue scores exceed one or more of the thresholds, providing issue resolution content data to the user to receive user response data that characterizes the potential issue and that indicates whether the potential issue is a user question related to one or more of the user experience pages or a usability issue in one or more of the user experience pages;

if the user response data indicates that the potential issue is the user question, displaying similar user questions and responses to the similar user questions, to improve a user experience of the user in the tax return preparation system; and if the user response data indicates that the potential issues is the usability issue, alerting one or more service provider support personnel of the potential issue, to facilitate designing around the usability issue to improve user experiences of subsequent users of the tax return preparation system.

2. The computing system implemented method of claim 1, wherein the issue resolution content data includes:

first user input element data representing first user input elements that receive issue selection data from the user, the issue selection data representing the usability issue in one or more of the user experience pages or the user question that is related to one or more of the user experience pages, wherein the user response data includes the issue selection data.

3. The computing system implemented method of claim 2, wherein the issue resolution content data includes:

second user input element data representing a second user input element that receives user question data from the user, the user question data representing the user question that related to one or more of the user experience pages, wherein the user response data includes the user question data.

4. The computing system implemented method of claim 3, wherein the first user input elements are user interface buttons, and the second user input element is an input text box.

5. The computing system implemented method of claim 1, wherein the issue resolution content data includes question improvement suggestions that are at least partially based on a linguistic analysis of search terms of the user question.

6. The computing system implemented method of claim 5, further comprising:

providing an issue resolution engine that generates the question improvement suggestions by performing the linguistic analysis of the search terms of the user question.

7. The computing system implemented method of claim 5, wherein the usability issue is user error that is likely to occur within a segment of users of the tax return preparation system.

8. The computing system implemented method of claim 1, wherein the system access data includes user system characteristics, the user system characteristics including one or more of:

an operating system used by the user computing system to access the tax return preparation system;

a hardware identifier of the user computing system used to access the tax return preparation system; and a web browser used by the user computing system to access the tax return preparation system.

9. The computing system implemented method of claim 8, wherein the system access data is at least partially based on clickstream data from the user computing system.

10. The computing system implemented method of claim 1, further comprising:

generating receiver operating characteristics data representing receiver operating characteristics of one or more of the predictive models; and determining one or more of the thresholds at least partially based on the receiver operating characteristics of one or more of the predictive models.

11. The computing system implemented method of claim 1, wherein the system access data is selected from a group of system access data consisting of:

data representing features or characteristics associated with an interaction between the user computing system and the tax return preparation system;

data representing a web browser of the user computing system;

data representing an operating system of the user computing system;

data representing a media access control address of the user computing system;

data representing user credentials used to access the tax return preparation system;

data representing a user account;
data representing a user account identifier;
data representing how quickly user credentials are provided to the tax return preparation system to obtain access to the user account;
data representing a duration that a user computing system spends on a particular user experience page;
data representing a user flipping back and forth between two of more of the user experience pages;
data representing a selection tool repeatedly hovering over a help menu or help icon;
data representing comparisons between navigation behavior for the user and navigation behavior of other users within the tax return preparation system;
data representing a duration of an access session between the user computing system and the tax return preparation system;
data representing a duration for preparing a tax return for the user;
data representing conflicts between visited user experience pages and user experience pages that the user is highly likely to have visited at least partially based on the user characteristics data; and
data representing an IP address of the user computing system.

12. The computing system implemented method of claim 1, wherein displaying similar user questions and responses to the similar user questions, includes:
analyzing search terms of the user question;
determining one or more topics for the user question;
searching a user question database for the similar user questions at least partially based on the one or more topics for the user question, wherein the similar user questions include at least some of the one or more topics for the user question;
retrieving hyperlinks or other web-based references to the similar user questions; and
displaying the hyperlinks or other web-based references to the similar user questions to enable a user to access the similar user questions.

13. The computing system implemented method of claim 1, further comprising:
training the predictive model data by applying a predictive model training operation to prior system access data and/or prior user characteristics data, the prior system access data representing system access activities of prior users of the tax return preparation system, the prior user characteristics data representing user characteristics of the prior users of the tax return preparation system.

14. The computing system implemented method of claim 13, wherein, the predictive model training operation is selected from a group of predictive model training operations, consisting of:
regression;
logistic regression;
decision trees;
artificial neural networks;
support vector machines;
linear regression;
nearest neighbor methods;
distance based methods;
naive Bayes;
linear discriminant analysis; and
k-nearest neighbor algorithm.

15. The computing system implemented method of claim 1, wherein the user characteristics data is selected from a group of user characteristics data, consisting of:
data indicating an age of the user;
data indicating an age of a spouse of the user;
data indicating a zip code;
data indicating a tax return filing status;
data indicating state income;
data indicating a home ownership status;
data indicating a home rental status;
data indicating a retirement status;
data indicating a student status;
data indicating an occupation of the user;
data indicating an occupation of a spouse of the user;
data indicating whether the user is claimed as a dependent;
data indicating whether a spouse of the user is claimed as a dependent;
data indicating whether another taxpayer is capable of claiming the user as a dependent;
data indicating whether a spouse of the user is capable of being claimed as a dependent;
data indicating salary and wages;
data indicating taxable interest income;
data indicating ordinary dividend income;
data indicating qualified dividend income;
data indicating business income;
data indicating farm income;
data indicating capital gains income;
data indicating taxable pension income;
data indicating pension income amount;
data indicating IRA distributions;
data indicating unemployment compensation;
data indicating taxable IRA;
data indicating taxable Social Security income;
data indicating amount of Social Security income;
data indicating amount of local state taxes paid;
data indicating whether the user filed a previous years' federal itemized deduction;
data indicating whether the user filed a previous years' state itemized deduction;
data indicating whether the user is a returning user to a tax return preparation system;
data indicating an annual income;
data indicating an employer's address;
data indicating contractor income;
data indicating a marital status;
data indicating a medical history;
data indicating dependents;
data indicating assets;
data indicating spousal information;
data indicating children's information;
data indicating an address;
data indicating a name;
data indicating a date of birth;
data indicating educator expenses;
data indicating health savings account deductions;
data indicating moving expenses;
data indicating IRA deductions;
data indicating student loan interest deductions;
data indicating tuition and fees;
data indicating medical and dental expenses;
data indicating state and local taxes;
data indicating real estate taxes;
data indicating personal property tax;
data indicating mortgage interest;
data indicating charitable contributions;

data indicating casualty and theft losses;
data indicating unreimbursed employee expenses;
data indicating an alternative minimum tax;
data indicating a foreign tax credit;
data indicating education tax credits;
data indicating retirement savings contributions; and
data indicating child tax credits.

16. A computing system implemented method for detecting usability issues in one or more user experience pages of a tax return preparation system, comprising:
providing, with one or more computing systems, a tax return preparation system;
providing, with the tax return preparation system, tax return interview content data representing one or more user experience pages of a tax return preparation interview, to obtain user characteristics data from a user computing system for a user to enable the tax return preparation system to prepare a tax return for the user;
receiving system access data representing one or more system access activities by the user within one or more of the user experience pages of the tax return preparation interview;
storing the user characteristics data and the system access data of the user in memory allocated for use by the tax return preparation system;
providing predictive model data representing one or more predictive models that are trained to determine a likelihood of a potential issue with one or more of the user experience pages of the tax return preparation interview, at least partially based on the system access data and segmentation of users based on user characteristics of the users;
applying the system access data to the predictive model data to generate potential issue score data at least partially based on the system access data, the predictive model data representing one or more potential issue scores that represent the likelihood of a potential issue in one or more of the user experience pages;
providing issue resolution content data to the user to notify the user that the tax return preparation system detects a potential issue for the user within the tax return preparation interview, at least partially based on one or more of the potential issue scores;
receiving user response data from the user in response to providing the issue resolution data to the user, the user response data representing a user response that characterizes the potential issue as a user question with content of one or more of the user experience pages or as a usability issue in one or more of the user experience pages;
if the user response data indicates that the potential issue is the user question, displaying similar user questions and responses to the similar user questions, to improve a user experience of the user in the tax return preparation system; and
if the user response data indicates that the potential issue is the usability issue, alerting one or more service provider support personnel of the potential issue, to facilitate addressing the usability issue and to improve user experiences of subsequent users of the tax return preparation system.

17. The computing system implemented method of claim 16, wherein the issue resolution content data includes:
first user input element data representing first user input elements that receive issue selection data from the user, the issue selection data representing the usability issue in one or more of the user experience pages or the user question that is related to one or more of the user experience pages; and
second user input element data representing a second user input element that receives user question data from the user, the user question data representing the user question that related to one or more of the user experience pages,
wherein the user response data includes the issue selection data and the question data.

18. The computing system implemented method of claim 16, wherein the issue resolution content data includes question improvement suggestions that are at least partially based on a linguistic analysis of search terms of the user question.

19. The computing system implemented method of claim 18, further comprising:
providing an issue resolution engine that generates the question improvement suggestions by performing the linguistic analysis of the search terms of the user question.

20. The computing system implemented method of claim 18, wherein the usability issue is user error that is likely to occur within a segment of users of the tax return preparation system.

21. The computing system implemented method of claim 16, wherein the system access data is selected from a group of system access data consisting of:
data representing features or characteristics associated with an interaction between the user computing system and the tax return preparation system;
data representing a web browser of the user computing system;
data representing an operating system of the user computing system;
data representing a media access control address of the user computing system;
data representing user credentials used to access the tax return preparation system;
data representing a user account;
data representing a user account identifier;
data representing how quickly user credentials are provided to the tax return preparation system to obtain access to the user account;
data representing a duration that a user computing system spends on a particular user experience page;
data representing a user flipping back and forth between two of more of the user experience pages;
data representing a selection tool repeatedly hovering over a help menu or help icon;
data representing comparisons between navigation behavior for the user and navigation behavior of other users within the tax return preparation system;
data representing a duration of an access session between the user computing system and the tax return preparation system;
data representing a duration for preparing a tax return for the user;
data representing conflicts between visited user experience pages and user experience pages that the user is highly likely to have visited at least partially based on the user characteristics data; and
data representing an IP address of the user computing system.

22. The computing system implemented method of claim 16, wherein displaying similar user questions and responses to the similar user questions, includes:

analyzing search terms of the user question;
determining one or more topics for the user question;
searching a user question database for the similar user questions at least partially based on the one or more topics for the user question, wherein the similar user questions include at least some of the one or more topics for the user question;
retrieving hyperlinks or other web-based references to the similar user questions; and
displaying the hyperlinks or other web-based references to the similar user questions to enable a user to access the similar user questions.

23. The computing system implemented method of claim 16, further comprising:
training the predictive model data by applying a predictive model training operation to prior system access data and/or prior user characteristics data, the prior system access data representing system access activities of prior users of the tax return preparation system, the prior user characteristics data representing user characteristics of the prior users of the tax return preparation system.

24. The computing system implemented method of claim 16, further comprising:
applying user characteristics data of the user to the predictive model to generate one or more of the potential issue scores, wherein the user characteristics data is selected from a group of user characteristics data, consisting of:
data indicating an age of the user;
data indicating an age of a spouse of the user;
data indicating a zip code;
data indicating a tax return filing status;
data indicating state income;
data indicating a home ownership status;
data indicating a home rental status;
data indicating a retirement status;
data indicating a student status;
data indicating an occupation of the user;
data indicating an occupation of a spouse of the user;
data indicating whether the user is claimed as a dependent;
data indicating whether a spouse of the user is claimed as a dependent;
data indicating whether another taxpayer is capable of claiming the user as a dependent;
data indicating whether a spouse of the user is capable of being claimed as a dependent;
data indicating salary and wages;
data indicating taxable interest income;
data indicating ordinary dividend income;
data indicating qualified dividend income;
data indicating business income;
data indicating farm income;
data indicating capital gains income;
data indicating taxable pension income;
data indicating pension income amount;
data indicating IRA distributions;
data indicating unemployment compensation;
data indicating taxable IRA;
data indicating taxable Social Security income;
data indicating amount of Social Security income;
data indicating amount of local state taxes paid;
data indicating whether the user filed a previous years' federal itemized deduction;
data indicating whether the user filed a previous years' state itemized deduction;
data indicating whether the user is a returning user to a tax return preparation system;
data indicating an annual income;
data indicating an employer's address;
data indicating contractor income;
data indicating a marital status;
data indicating a medical history;
data indicating dependents;
data indicating assets;
data indicating spousal information;
data indicating children's information;
data indicating an address;
data indicating a name;
data indicating a date of birth;
data indicating educator expenses;
data indicating health savings account deductions;
data indicating moving expenses;
data indicating IRA deductions;
data indicating student loan interest deductions;
data indicating tuition and fees;
data indicating medical and dental expenses;
data indicating state and local taxes;
data indicating real estate taxes;
data indicating personal property tax;
data indicating mortgage interest;
data indicating charitable contributions;
data indicating casualty and theft losses;
data indicating unreimbursed employee expenses;
data indicating an alternative minimum tax;
data indicating a foreign tax credit;
data indicating education tax credits;
data indicating retirement savings contributions; and
data indicating child tax credits.

25. A system that detects usability issues in one or more user experience pages of a tax return preparation system, comprising:
one or more processors; and
memory having instructions which, if executed by the one or more processors, cause the one or more processors to perform a process for detecting usability issues in one or more user experience pages of a tax return preparation system, the process comprising:
providing, with one or more computing systems, a tax return preparation system;
providing, with the tax return preparation system, tax return interview content data representing one or more user experience pages of a tax return preparation interview, to obtain user characteristics data from a user computing system for a user to enable the tax return preparation system to prepare a tax return for the user, the user characteristics data representing user characteristics of the user;
monitoring system access data representing one or more system access activities by the user within one or more of the user experience pages of the tax return preparation interview;
storing the user characteristics data and the system access data of the user in memory allocated for use by the tax return preparation system;
providing predictive model data representing one or more predictive models that are trained to determine a likelihood of a potential issue with one or more of the user experience pages of the tax return preparation interview, at least partially based on segmentation of users based on the user characteristics of users of the tax return preparation system;

applying one or more of the user characteristics data and the system access data to the predictive model data to transform one or more of the user characteristics data and the system access data into potential issue score data representing one or more potential issue scores that represent the likelihood of a potential issue in one or more of the user experience pages;

applying threshold data to the potential issue score data to determine if one or more of the potential issue scores exceed one or more thresholds represented by the threshold data;

if one or more of the potential issue scores exceed one or more of the thresholds, providing issue resolution content data to the user to receive user response data that characterizes the potential issue and that indicates whether the potential issue is a user question related to one or more of the user experience pages or a usability issue in one or more of the user experience pages;

if the user response data indicates that the potential issue is the user question, displaying similar user questions and responses to the similar user questions, to improve a user experience of the user in the tax return preparation system; and if the user response data indicates that the potential issues is the usability issue, alerting one or more service provider support personnel of the potential issue, to facilitate designing around the usability issue to improve user experiences of subsequent users of the tax return preparation system.

26. The system of claim 25, wherein the issue resolution content data includes:

first user input element data representing first user input elements that receive issue selection data from the user, the issue selection data representing the usability issue in one or more of the user experience pages or the user question that is related to one or more of the user experience pages; and second user input element data representing a second user input element that receives user question data from the user, the user question data representing the user question that related to one or more of the user experience pages, wherein the user response data includes the issue selection data and the question data.

27. The system of claim 25, wherein the issue resolution content data includes question improvement suggestions that are at least partially based on a linguistic analysis of search terms of the user question.

28. The system claim 27, wherein the usability issue is user error that is likely to occur within a segment of users of the tax return preparation system.

29. The system claim 25, wherein the system access data is selected from a group of system access data consisting of:

data representing features or characteristics associated with an interaction between the user computing system and the tax return preparation system;

data representing a web browser of the user computing system;

data representing an operating system of the user computing system;

data representing a media access control address of the user computing system;

data representing user credentials used to access the tax return preparation system;

data representing a user account;

data representing a user account identifier;

data representing how quickly user credentials are provided to the tax return preparation system to obtain access to the user account;

data representing a duration that a user computing system spends on a particular user experience page;

data representing a user flipping back and forth between two of more of the user experience pages;

data representing a selection tool repeatedly hovering over a help menu or help icon;

data representing comparisons between navigation behavior for the user and navigation behavior of other users within the tax return preparation system;

data representing a duration of an access session between the user computing system and the tax return preparation system;

data representing a duration for preparing a tax return for the user;

data representing conflicts between visited user experience pages and user experience pages that the user is highly likely to have visited at least partially based on the user characteristics data; and data representing an IP address of the user computing system.

30. The system of claim 25, wherein displaying similar user questions and responses to the similar user questions, includes:

analyzing search terms of the user question;

determining one or more topics for the user question;

searching a user question database for the similar user questions at least partially based on the one or more topics for the user question, wherein the similar user questions include at least some of the one or more topics for the user question;

retrieving hyperlinks or other web-based references to the similar user questions; and displaying the hyperlinks or other web-based references to the similar user questions to enable a user to access the similar user questions.

* * * * *